United States Patent [19]

Nakatsuyama et al.

[11] Patent Number: 5,765,177

[45] Date of Patent: Jun. 9, 1998

[54] DOCUMENT PROCESSING METHOD AND APPARATUS FOR SEARCHING DOCUMENTS HAVING A GRAPH BASED DOCUMENT LOGIC STRUCTURE

[75] Inventors: Hisashi Nakatsuyama; Koji Kusumoto; Makoto Murata, all of Kanagawa, Japan

[73] Assignee: Fuji Xerox Co., Ltd., Tokyo, Japan

[21] Appl. No.: 815,584

[22] Filed: Mar. 12, 1997

Related U.S. Application Data

[63] Continuation of Ser. No. 514,364, Aug. 11, 1995, abandoned, which is a continuation of Ser. No. 100,278, Aug. 2, 1993, abandoned.

[30] Foreign Application Priority Data

Aug. 3, 1992 [JP] Japan ................................. 4-206722

[51] Int. Cl.$^6$ ................................................. G06F 7/00
[52] U.S. Cl. ................................. 707/514; 707/513
[58] Field of Search ........................... 395/774, 776, 395/777, 803, 602, 603; 707/513, 514, 515, 516, 2, 3

[56] References Cited

U.S. PATENT DOCUMENTS

| | | | |
|---|---|---|---|
| 4,945,475 | 7/1990 | Bruffey et al. | 395/600 |
| 5,181,162 | 1/1993 | Smith et al. | 364/419 |
| 5,197,001 | 3/1993 | Mukherjee | 364/403 |
| 5,230,072 | 7/1993 | Smith et al. | 395/600 |
| 5,276,874 | 1/1994 | Thomson | 395/600 |
| 5,295,261 | 3/1994 | Simonetti | 395/600 |
| 5,369,763 | 11/1994 | Biles | 395/600 |
| 5,454,101 | 9/1995 | Mackay et al. | 395/600 |
| 5,644,776 | 7/1997 | DeRose et al. | 395/761 |

FOREIGN PATENT DOCUMENTS 2-297173  12/1990  Japan .

OTHER PUBLICATIONS

Oda (ISO/IS 8613) Information Processing–Text and Office System–Office Document Architecture (ODA) and Interchange Format, 1988.

Anderson et al., "The UNIX C Shell Field Guide," Personal Media, 1987.

D. Knuth, "The Art of Programming" Science Corporation, 1987.

Maclead, "Storage and Retrieval of Structured Documents," Information Processing & Management, vol. 26, No. 2, pp. 197–208, 1990.

Macleod, "A Query Language for Retrieving Information from Hierarchic Text Structures," The Computer Journal, vol. 34, No. 3, 1991.

*Primary Examiner*—Joseph H. Feild
*Assistant Examiner*—Stephen Hong
*Attorney, Agent, or Firm*—Finnegan, Henderson, Farabow, Garrett & Dunner, L.L.P.

[57] ABSTRACT

A method and an apparatus for processing documents expressed in terms of the graph based on the graph theory. Grouped constituent description series as the contents of a predescribed document are stored in a constituent description series retaining section. A first identifier acquisition section acquires an identifier series corresponding to the constituent satisfying a designated first condition from the grouped constituent description series that are retained in the constituent description series retaining section. The acquired identifier series is stored in an identifier series retaining section. A second identifier acquisition section acquires the identifier series satisfying a designated second condition from the identifier series that are retained in the identifier series retaining section. The acquired identifier series is stored in the identifier series retaining section in a state that it can be distinguished from other constituent description series already retained therein. A constituent description series acquisition section acquires a constituent description series corresponding to the identifier series that is acquired from the identifier series retaining section by the second identifier acquisition section, from the specified constituent description series that are retained in the constituent description series retaining section.

12 Claims, 13 Drawing Sheets

DOCUMENT PROCESSING METHOD AND APPARATUS FOR SEARCHING DOCUMENTS HAVING A GRAPH BASED DOCUMENT LOGIC STRUCTURE

This application is a continuation of application Ser. No. 08/514,364, filed Aug. 11, 1995, which is a continuation of application Ser. No. 08/100,278, filed Aug. 2, 1993, both now abandoned.

BACKGROUND OF THE INVENTION

The present invention relates to a method and an apparatus for processing documents expressed in terms of document logic structure.

Trees have been widely used to express logic structures of electronic documents. The international standards ODA (ISO/IS 8613, Information Processing-Text and Office System-Office Document Architecture (ODA) and Interchange Format (1988)), for example, expresses the logic structure of documents using nodes (objects). In the hypertext, a network consisting of nodes and links represents the logic structure of a document.

A prior document processor uses document logic structure for retrieving, insertion, composition, and updating of electronic documents and electronic document parts stored in a memory device. To perform retrieve, insertion, composition, and updating of documents and document parts, the document processor specifies conditions and operations using an inquiry language.

In some prior document processors, structure has been proposed for specifying a document node or process object to be processed.

One of such prior document processors executes programs described in the procedural operation language, which resembles the LISP language to acquire an output document from among grouped input documents as structured documents each having the logic structure of a paper as shown in FIG. 18.

Document Program Identifier: Abstract Creation
(SetID "Abstract Creation")
(MakerRoot (MakeNeNode "Abstract"))
(AddChild Abstract (MakeNewNode "Document 1"))
(AddChild Abstract (MakeNewNode "Document 2"))
(AddChild Abstract (MakeNewNode "Document 3"))
(AddSubTree Document 1 Title@paper A)
(AddSubTree Document 1 Author@paper A)
(AddSubTree Document 1 Beginning@paper A)
(AddSubTree Document 1 Abstract@paper A)
(AddSubTree Document 2 Title@paper B)
(AddSubTree Document 2 Author@paper B)
(AddSubTree Document 2 Belonging@paper B)
(AddSubTree Document 2 Abstract@paper B)
(AddSubTree Document 3 Title@paper C)
(AddSubTree Document 3 Author@paper C)
(AddSubTree Document 3 Belonging@paper C)
(AddSubTree Document 3 Abstract@paper C)
(ChangeText "X laboratory" "Our laboratory")
(SetAttribute "Editor" "Auto")
(SetAttribute "Editing date" "Date")

The document processor executes the programs as mentioned above to process the input documents as shown in FIG. 18, and produces an output document as shown in FIG. 19.

On the other hand, another prior document processor executes the program described in an inquiry language, which resembles the SQL language as described below, to extract document parts from the structured document with a logic structure of a paper as shown in FIG. 20.

Project
Project
  Title
  Author
  Project
    Paragraph tile
  Collapse
  From paragraph
From *
From /Data base related study/Paper This document processor executes the programs as mentioned above to process the input documents as shown in FIG. 20, and produces an output document as shown in FIG. 21. The operation of this document processor results in a document or an arrangement of document parts.

Either of the described prior document processors specifies node as a process object by designating the condition on an attribute of the node. More specifically, the document processor designates the condition "Tag "author" is attached", for example, to specify the node to be processed.

"Retrieval" of the document part means a process to extract the node specified by the condition designation from a document. An "attribute update" of a document part means altering an attribute of the specified node. An "insertion" of the document part corresponds to designating a position (e.g., immediately after) relative to the specified node and to placing the specified node at the position.

In the above-described document processors, all of the operations applied to documents or document parts must be described in the operation language. Accordingly, sequences of processes, such as extraction of document parts, structure alteration, attribute setting, and text alteration, are performed together in a single system process.

When a single process is performed, it is very difficult to achieve good cooperative operating language processing for a first document processing function (device) and another document processing function (device).

The problems of cooperation will be described in connection with a specific example.

When a node is expressed in text, the general processing function (device) may also serve as the document processing function (device). Accordingly, in a circumstance where the general processing function (device) is combined with the above-described document processing function (device), the following processes can be performed:

1) take out a series of nodes to be processed by the document processing function;

2) make insertion and replacement of character strings contained in the node series by the text processing function; and 3) insert a node series obtained by process 2) above into another node series by the document processing function.

However, it is very difficult to combine the general text processing function with the above-described document processing function in the inquiry language approach. Therefore, it is impossible to realize processes 1) to 3) in a separate manner. Further, the following problems arise.

The operation object in the text processing function is only the node series that is taken out by process 1) above and further limited. Process 2) is automatically performed on the whole node series after processing of the limited node series is completed. As a result, the node series, which should not be altered, may be altered.

Further, the node series, as a process object, is extracted from a document by process 1), and undergoes process 2). After the document undergoes process 2), it is impossible to specify the positions in the original document where the node series were located. The reason for this is that, since the node series are specified by designating the conditions of the node attributes, it is impossible to know exactly the positions in the original document where the node series were located. Therefore, process 3) cannot be performed.

Thus, the proposed document processing function rejects the fine processing when it is combined with another document processing function.

SUMMARY OF THE INVENTION

Accordingly, an object of the present invention is to provide a document processing method which can exactly perform the processes of retrieve, insertion, composition, and update of documents or document parts, and to provide a document processing apparatus for executing the document processing method. In order to attain the above object, the present invention provides a document processing method for performing predetermined processing of documents expressed in terms of a graph, based on logical document structure, including the steps of acquiring a first identifier series corresponding to a constituent satisfying a designated first condition from a constituent description series including at least one constituent with an identifier attached thereto and corresponding to a predescribed document or documents or a document part or parts, acquiring a second identifier series satisfying a designated second condition from the first identifier series, and performing a predetermined process the constituent description series corresponding to the predescribed document or documents or the document part or parts on the basis of the second identifier series satisfying the second condition.

Also, the invention provides a document processing apparatus for retrieving parts of documents expressed in terms of a graph, based on logical document structure, including first identifier acquisition means for acquiring a first identifier series corresponding to a constituent satisfying a designated first condition from a constituent description series including at least one constituent with an identifier attached thereto and corresponding to a predescribed document or documents or a document part or parts, identifier series retaining means for retaining the first identifier series acquired by the first identifier acquisition means, second identifier acquisition means for acquiring a second identifier series satisfying a designated second condition from the first identifier series retained in the identifier series retaining means, and constituent description series acquisition means for acquiring a constituent description series corresponding to the second identifier series acquired by the second identifier acquisition means from the constituent description series corresponding to the predescribed document or documents or the document part or parts.

DETAILED DESCRIPTION OF THE PREFERRED EMBODIMENTS

The preferred embodiments of the present invention will be described with reference to the accompanying drawings.

The first embodiment of the present invention will be described with reference to FIGS. 1 through 11.

Figure 1:
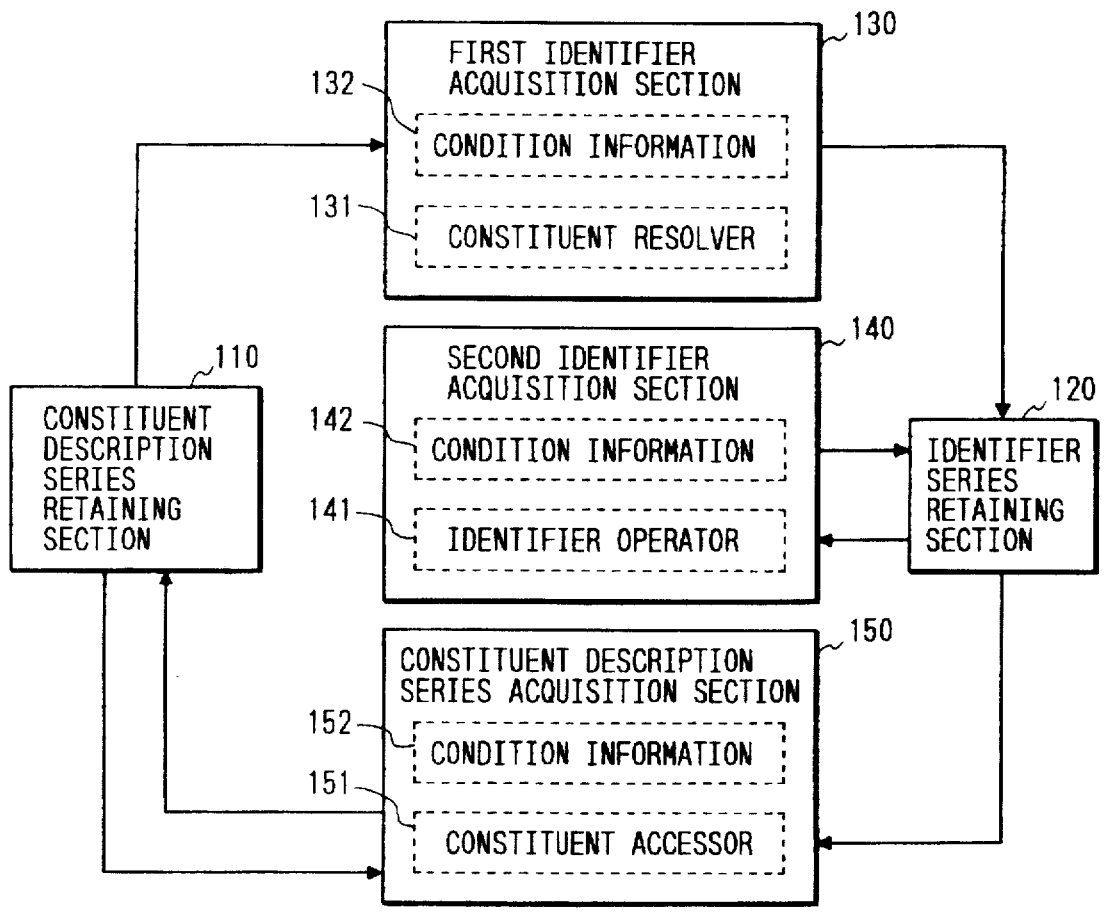
FIG. 1 is a functional block diagram showing a document processing apparatus according to a first embodiment of the present invention.

In FIG. 1, the document processing apparatus includes a constituent description series retaining section 110, an identifier series retaining section 120, a first identifier acquisition section 130, a second identifier acquisition section 140, and a constituent description series acquisition section 150.

The constituent description series retaining section 110 stores one or more structured electronic documents. The electronic document can be described in terms of a graphical logic structure.

Accordingly, in this embodiment, the node of a graph is defined as a constituent. A description corresponding to the constituent is defined as a constituent description. A plurality of arrayed constituents is defined as a constituent description series.

With this definition, the whole document can be expressed by the constituent description series describing all the nodes of the graph. Particularly, a constituent having document contents, such as text and figure, is called a content portion. The parts of the document (such as, chapter, caption, and figure) are also described by the constituent description series describing the nodes that constitute the document parts.

An example of the constituent description series in the logic structure is given below.

logical-object {
object-type document-logical -root,
description-body {
object-identifier "3",
subordinates "2",
user-visible-name "document logic root" }}
logical-object {
object-type composite-logical,
description-body {
  object-identifier "30",
  suordinates "2",
  user-visible-name "chapter 1" }}
logical-object {
object-type basic-logical,
description-body {
  object-identifier "300",
  user-visible-name "section 1.1" }}
logical-object {
object-type basic-logical,
description-body {
  object-identifier "301",
  user-visible-name "section 1.2" }}
logical-object {
object-type basic-logical,
description-body {
  object-identifier "302",
  user-visible-name "section 1.21 }}
In the following case,
logical-object {
object-type document-logical-root,
description-body {
object-identifier "3",
suordinates "2",
user-visible-name "document logic root" }}
is a constituent, and is an identifier.

In the above example, five constituents make up one constituent description series having a meaning. In a case where two constituents are extracted from the above constituent description series under a certain condition, one constituent description series having a meaning is described using two constituents.

In the first identifier acquisition section 130, a constituent resolver 131 operates according to condition information 132 as a preset first condition, acquire an identifier series which corresponds to the constituent satisfying the condition information 132 and which is obtained from a group of constituent description series stored in the constituent description series retaining section 110. The condition information 132 is indicative of a condition for retrieving the constituents.

The identifier series retaining section 120 retains the identifier series acquired by the first identifier acquisition section 130.

In the second identifier acquisition section 140, an identifier operator 141 operates, according to condition information 142 as a preset second condition, acquire an identifier series which satisfies the second condition information and which is obtained from the identifier series retained in the identifier series retaining section 120. The condition information 142 is indicative of a condition for acquiring one or more identifiers.

The identifier series acquired by the identifier section 140 is retained in the identifier series retaining section 120. The identifier series retaining section 120 stores the identifier series acquired by the first identifier acquisition section 130 in a state enabling it to be distinguished from the identifier series acquired by the second identifier acquisition section 140.

In the constituent description series acquisition section 150, a constituent accessor 151 operating according to condition information 152 which is indicative of a condition for acquiring the constituent description, acquires a gained constituent description series from a group of constituent description series which are retained in the constituent description series retaining section 110. The constituent accessor 151 gains the identifier series acquired by the second identifier acquisition section 140 from the identifier series retaining section 120, and gains the constituent description series corresponding to the gained identifier series from the group of the constituent description series which are retained in the constituent description series retaining section 110. The gained constituent description series is stored in the constituent description series retaining section 110 in a state that it can be distinguished from other constituent description series already retained therein.

In this embodiment, the first identifier acquisition section 130, the second identifier acquisition section 140, and the constituent description series acquisition section 150 are realized in a manner that software (a program) for performing the functions of the constituents is executed by control means such as a processor or a central processing unit (CPU) perform the functions of the constituents.

The constituents in this embodiment are realized in the form of individual program commands. Data structures define the constituent description series and the identifier series, and are transferred among commands.

As a matter of course, the functions of two or more means may be assigned to one command. In this case, the input/output (I/O) interface of the command is based on the I/O interface in the case where the commands are assigned to the respective means. Commands used in this embodiment will be described subsequently herein.

The commands run in the general UNIX operating system. Each command has a simple function. In actually processing documents, commands are approximately combined. Sophisticated processing can be realized in a manner that a command procedure, called a shell script, is prepared using the control function of a command processor or interpreter which is called a shell. A pipe or a file, which is temporarily generated, is used to direct a command as the input to another command.

The shell can be embodied as described in the document, "The UNIX C Shell Field Guide" written by Gail Anderson and Paul Anderson (translated as "UNIX C SHELL Field Guide" by Koichiroh Ochimizu and Atsuo Ohki, published by Personal Media, 1987 in Japan).

The constituent description series retaining section 110 and the identifier series retaining section 120 are embodied by a file system or a pipe (queue). Accordingly, these constituents function to relate the contents with the names at the time of storage and further function to access the content using the names. In a case where the content is used only once, the constituent functions to retain it temporarily with use of the pipe and without the names.

Figure 2:
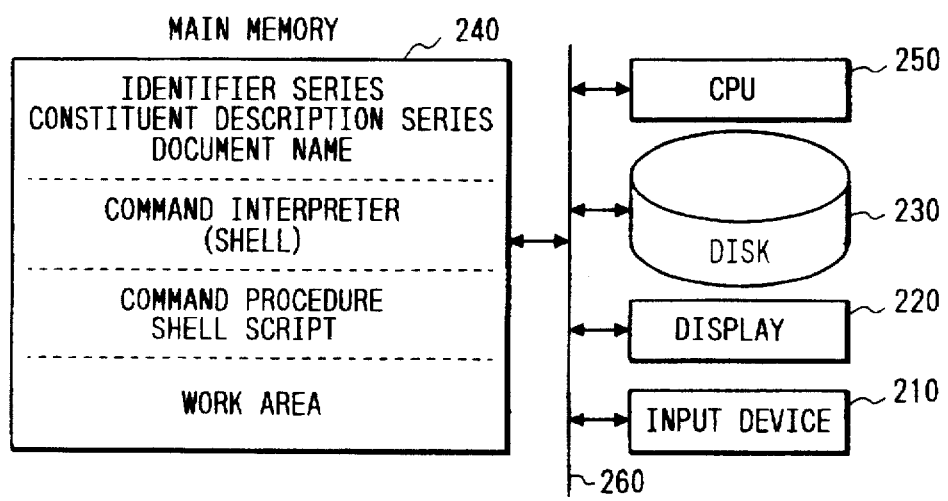
FIG. 2 is a block diagram showing a hardware arrangement to realize the document processing apparatus shown in FIG. 1.

FIG. 2 is a block diagram showing a hardware arrangement embodying the document processing apparatus thus far described and shown in FIG. 1. The hardware arrangement is that of a data processor, such as a work station or a computer.

In FIG. 2, an input device 210, a display 220, a disk 230, a main memory 240, and a central processing unit (CPU) 250 are interconnected by a bus 260.

The input device 210, which includes a key board and a mouse, enters various types of data, such as a command procedure and instructions.

The display 220 displays the document logic structure, constituent description series, document contents, and the command procedure.

The disk 230 stores the logic structures of electronic documents, i.e., documents, constituent description series, command interpreter (programs), command procedure, various data, and the like.

The main memory 240 stores electronic document files, constituent description series, command interpreter (program), command procedure, various data loaded from the disk 230, and command procedure, various data, and commands that are entered from the input device 210. The main memory 240 includes a work area used when the CPU 250 performs processing to accomplish sequences of operations on data. In the work area, a queue (pipe) is formed. The allocation of individual data and programs shown in the main memory 240 are illustrative and are not based on the data structure illustrated.

The CPU 250 executes the command interpreters after loading the command interpreters from the disk 230 to the main memory 240. That is, it executes various document processes, such as retrieval, insertion, composition, and update of electronic documents or document parts. The CPU 250 controls, through the bus 260, the respective system components connected thereto.

Description of the commands is based on the UNIX on-line manual, with some exceptions. Square brackets ([ ]) are used for indicating that the description therein is omissible. Pipes (|) and braces ({ }) are also used. The pipe indicates that either of the descriptions on both sides of the pipe is selected. The braces indicate that one of the descriptions put therein must be selected.

The relationship of the components in the functional block diagram shown in FIG. 1 and the components shown in the block diagram shown in FIG. 2 will be more fully explained.

The constituent description series retaining section 110 and the identifier series retaining section 120 in FIG. 1 correspond to the disk 230 and the main memory 240, respectively. The first identifier acquisition section 130, the second identifier acquisition section 140, and the constituent description series acquisition series section 130, the second identifier acquisition section 140, and the constituent description series acquisition section 150 correspond to the CPU 250.

The apparatus of the second, third, fourth and fifth embodiments of the present invention are embodied by the hardware arrangement of FIG. 2.

Next, the commands used in the embodiment will be described. A group of the commands used fall into the following categories with the functions indicated:

Constituent resolver: To acquire an identifier series satisfying a condition from among constituent description series.

Identifier operator: To acquire an identifier series satisfying a condition from among (a series of) identifier series.

Constituent accessor: To acquire constituent description series from among identifier series and documents.

Part insertion: To insert a part or parts into a document.

Attribute update: To update the attribute values in a specified constituent description.

Document operator: To acquire the name of a document satisfying a condition from among the identifier series and document names.

Document resolver: To acquire a series of document names satisfying a condition from among a series of document names.

Document accessor: To acquire the document contents from the document name.

The constituent resolver 131 in FIG. 1 corresponds to the constituent resolver command as just mentioned. The identifier operator 141 in FIG. 1 corresponds to the identifier operator command. The constituent accessor 151 in FIG. 1 corresponds to the constituent accessor command.

Next, the names, formats, functions, and options of the commands will be described for each category.

Constituent Resolver

With the input of a constituent description series and a condition, this category acquires an identifier series satisfying the condition. The condition involves the comparison of an attribute and a specified numerical value (=, ≠, ≦, ≧, <, >), and dictionary order comparison and verification of an attribute value and a specified character string.

Two examples of the commands o this category are given below.

[Name]

select-content: constituent resolver handling the content portion

[Format]

select-content series

[Function]

This command acquires a constituent such that a series of characters given as a string appears as a partial character string, from a document file specified by the name. In this case, capital and small letters are treated alike (when a series of characters "abc", for example, is specified as a string, it is also coincident with a character string "ABC"). When no file name is used, the command reads a constituent description series from a standard input, e.g., a terminal, and the same is correspondingly applied thereto hereinafter.

[Name]

select-type: constituent resolver handling the attribute "uobject-type"

[Format]

select-type series

[Function]

This command acquires an identifier of the constituent of which the value of the attribute "uobject-type" satisfies a given condition, from a document file specified by the file name, and writes it to a standard output, for example, a terminal, and the same is correspondingly applied thereto hereafter. When the "-e" option is not specified, the command acquires an identifier of the constituent for which the value of the attribute "uobject-type" completely coincides with a series of characters given as a string. Capital and small letters are treated alike.

-e: to acquire such a constituent that its string appears as a partial character string of the attribute "uobject-type".

Identifier Operator

With the input of identifier series and condition, this category lists up identifiers of the constituents of which values of the specified attributes satisfy the condition.

Four examples of the commands belonging to this category follow:

[Name]
above
[Format]
above
[Function]

This command reads two identifier series specified by the file name, selects from among the identifiers, which are contained in the first identifier series, the identifier which is the ancestor of any of the identifiers contained in the second identifier series, and writes it to the standard output. When the file name is omitted, the command reads the identifier series from the standard output.

[Name]
below
[Format]
below [file name]
[Function]

This command reads two identifier series specified by the file name, selects from among the identifiers which are contained in the first identifier series, the identifier which is the descendant of any of the identifiers contained in the second identifier series, and writes it to the standard output. When the file name is omitted, the command reads the identifier series from the standard input.

[Name]
bottom
[Format]
bottom [file name]
[Function]

This command selectively reads only identifiers, which are not ancestors of other identifiers, from the identifier series file specified by the file name, and writes them to the standard output. When no file name is designated, the command reads the identifier series from the standard input.

For example, when <31> <312> <3123> <313> <333> is given as the input (in the example, one identifier series consisting of five identifiers), the output is <3123> <313> <333> (one identifier series).

[Name]
union
[Format]
union
[Function]

This command obtains the union of sets from two identifier series contained in the file specified by the file name, and writes it to the standard output. When no file name is designated, the command reads the identifier series from the standard input.

For example, when the following two identifier series are given:

<31> <3123> <333> and
<312> <3123> <333> the following output is obtained (one identifier series)

<31> <312> <3123> <333>.

Other commands, like the "union" command, which perform the set operation with the input of two identifier series (set), are, for example:

(a) intersection: To obtain the intersection set with the input of two identifier series (b) difference: To obtain the difference set with the input of two identifier series (c) unique: To obtain the set of identifiers with the input of the identifier series.

Constituent Accessor

With the input of the constituent description series, the identifier, and the condition, the category acquires the constituent description series satisfying the condition. The condition may be the connection information as already described in connection with the identifier operator. If no condition is presented, the command takes out the constituent description of a constituent corresponding to each identifier in the identifier series.

A command example belonging to this category is given below.

[Name]
extract
[Format]
extract id-file filename
[Function]

This command acquires a constituent description corresponding to an identifier series specified by "id-file" (identifier series file) from a document file specified by the "id-file". When "-" is given as the "id-file", the command reads an identifier from the standard input.

When "-" is given as the file name, the command reads a constituent description series from the standard input. It is prohibited that "-" be given to both the "id-file" and the "file name".

-s: to take out a constituent description series of a partial tree for which the vertex is the constituent having a specified identifier.

Part Insertion

With the input of the identifier indicating the location to which a part is to be inserted, a document part file (constituent description series), and a document file (constituent description series), the category inserts a part into a document file. When the part is inserted, the identifier, if required, is reassigned so that the identifier has a single meaning in the document.

An example of the command in this category follows:

insert
[Name]
insert {-ec | -yc | -eb | -yb} {-p id | id-filename}
[Format]
part-filename doc-filename
[Function]

This command inserts a constituent description series into the specified location in the document, and writes it to the standard output. The constituent description series and the document file are read out of the files specified by the "part-filename" and the "doc-filename", respectively. The insertion position is the head of the identifier, identifier file "id-filename", or is determined by another option on the basis of the identifier specified by the "-p" option. When "-" is specified for any of "part-filename", "doc-filename" and "id-filename", the command reads it from the standard input.

It is impossible to specify "-" a plurality of times. The identifiers in the constituent description in the output are rearranged according to the Dewey decimal sorting (reference is made to "The Art of Programming" by Donald E. Knuth, published by Addison-Welsley Publishing Company, 1973, translated as "Fundamental Calculation/Information Structure" by Katsuhiko Kakehi and Nobuo Yoneda, published Science Corporation, 1987 in Japan).

[Option]

-ec: To insert a part so as to be the first child of the constituent having a specified identifier (eldest child).

-yc: To insert a part so as to be the last child of the constituent having a specified identifier (youngest child).

-eb: To insert a part so as to be an elder brother of the constituent having a specified identifier (elder brother).

-yb: To insert a part so as to be a younger brother of the constituent having a specified identifier (younger brother).

-p id: To specify a node to which a constituent description series is to be inserted. It is specified as -p "301", for example.

Attribute Update

With the input of a constituent description series, an identifier series and an alteration instruction, the category updates the attribute according to an instruction. When no identifier is given, the command updates the attributes of all the constituents.

An example of a command in this category follows:
[Name]
chval
[Format]
chval {-n | -t} old new {id-file | -} doc-file
[Function]

This command replaces an old character string contained in an attribute value of the constituent corresponding to an identifier series of "id-file" (identifier series file) of those in the "doc-file" (document file) with a new character string. When "-" is given instead of the "id-file", the command reads an identifier series from the standard input. When no identifier is contained in the "id-file", the command handles all of the constituents in the "doc-file" as objects to be operated.

[Option]

-a: To handle the attribute "user visible name" as an operation object.

-t: To handle the attribute "uobject type" as an operation object.

Document Operator

With the input of an identifier series, document name and condition, the operator obtains the name of a document. If a given condition is satisfied, the document name is output. If it is not satisfied, nothing is output.

An example of a command belonging to this category follows:
[Name]
id-doc
[Format]
id-doc {-gt | -lt | -ge | -le | -eq | -ne} num {id-file { -} doc-file
[Function]

If the number of identifiers contained in the file specified by "id-file" (identifier series file) satisfies a given condition, "do-file" (document file) is output. When "-" is given instead of "id-file", an identifier series is read from the standard input.

[Option]

-gt num: it is true when the number of identifiers contained in id-file is larger than num.

-lt num: it is true when the number of identifiers contained in id-file is smaller than num.

-ge num: it is true when the number of identifiers contained in id-file is equal to or larger than num.

-le num: it is true when the number of identifiers contained in id-file is equal to or smaller than num.

-eq num: it is true when the number of identifiers contained in id-file is equal to num.

-le num: it is true when the number of identifiers contained in id-file is not equal to num.

Document Resolver

With the input of a series of document names and condition, this category is used for obtaining a series of document names, which satisfy the condition.

Each command enumerates the names of documents for which the specified attribute values satisfy the condition. The condition includes a comparison of an attribute and a specified numerical value (=, =, <, >, <, >) a dictionary order comparison, verification of an attribute value, and a specified character string. Commands to enumerate document names, authors, documents which include a key word containing a specific character string, and commands to enumerate the documents of a preset number of pages or more (or less), are involved in this category.

Document Accessor

This category is used for searching a constituent description series, as the contents of a document, by using the document name as an argument. The command may write the contents of a specified document file to the standard output. A file system may have the functions of the commands of this category.

Figure 3:
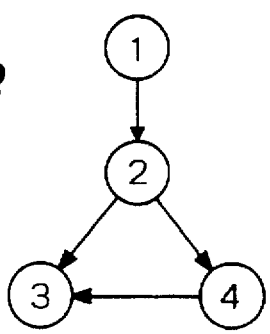
FIG. 3 is a diagram showing an example of a network structure.

As an example of the identifier operator based on the connection information, a command enumerates the identifiers of the constituents which are spaced a distance of a preset value or less apart from a constituent corresponding to a specified identifier. In the network structure as shown in FIG. 3, for example, the nodes spaced a distance of 1 or less apart from a node 1 are {1, 2}. In the figure, the four circles indicate nodes.

The preferred method for applying the command which performs an operation based on connection information, will now be described.

For simplicity, it is assumed that, each identifier for the constituent description has a single meaning in a document and is previously assigned to a constituent.

An adjacent matrix, of which the suffix is an identifier, is employed for the data structure. The identifier is a natural number. If a graph of the logic structure is a "strict" one, adjacent data can be obtained by using the following square matrix of degree m $A=a_{ij}$ ($1 \leq i, j \leq n$) as the adjacent matrix for an n number of constituent descriptions.

Here, "strict" means that a loop and a multiple arc are not present. A "loop" means an arc ranging from a node to its own node. A "multiple arc" means a plurality of arcs ranging from a node to another specific node.

$a_{ij}=$ 1 arc (i, j) is present 0 arc (i, j) is absent

For example, from $A^1$ (=A), $A^2$ (=A.A), . . . a, a node that can be obtained such before reaching the node; a route starting from another node must pass the link 1, 2, . . . , n times.

Further, from $$\sum_{i=1}^{n} A^i,$$

a node can be obtained such that before reaching the node, a route must pass the node n or less than n or less than n times.

In the case of the network as shown in FIG. 3, the adjacent matrix A is $$A = \begin{bmatrix} 0 & 1 & 0 & 0 \\ 0 & 0 & 1 & 1 \\ 0 & 0 & 0 & 0 \\ 0 & 0 & 1 & 0 \end{bmatrix}$$

Then, $$A^2 = A \cdot A = \begin{bmatrix} 0 & 0 & 1 & 1 \\ 0 & 0 & 1 & 0 \\ 0 & 0 & 0 & 0 \\ 0 & 0 & 0 & 0 \end{bmatrix}$$

$$A^3 = A^2 \cdot A = \begin{bmatrix} 0 & 0 & 1 & 0 \\ 0 & 0 & 0 & 0 \\ 0 & 0 & 0 & 0 \\ 0 & 0 & 0 & 0 \end{bmatrix}$$

$$A^4 = A^3 \cdot A = 0000$$

Since the graph defined by A is the DAG (directed acyclic graph):

if $$C = \sum_{i=1}^{\infty} A^i,$$

$$C = \sum_{i=1}^{3} A^i = \begin{matrix} 0 & 1 & 2 & 1 \\ 0 & 0 & 2 & 1 \\ 0 & 0 & 0 & 0 \\ 0 & 0 & 1 & 0 \end{matrix}$$

The component $c_{ij}$ of $C=c_{ij}$ ($0 \leq i, j \geq n$) indicates the total number of routes ranging from the node i to another note j.

By utilizing the nature of the connection information as described above, a command can be realized such that an identified series is output to the input of the identified series and the condition.

Generally, the logic structure of the structured document is expressed by the tree structure. The tree structure is a special network structure in which a limit is laid on the connection. Accordingly, a descendant relationship, such as a parent-child relationship, can be obtained by using the adjacent matrix. According to the present embodiment, the structured document may also be handled in the same manner as the document expressed by the network structure.

When the constituent description is expressed in terms of text, the general text operation tool (or language), such as "sed" and "awk" of UNIX standard commands may be used in combination with the embodiment.

In the object oriented data base, the identifiers which are internally unique are assigned to the objects. Accordingly, in this data base, if a natural number is related to the internal expression of the identifier in 1 to 1 correspondence, a program is structured to output an identifier series responsive the input of the identifier and the condition, with use the adjacent matrix.

Figure 4:
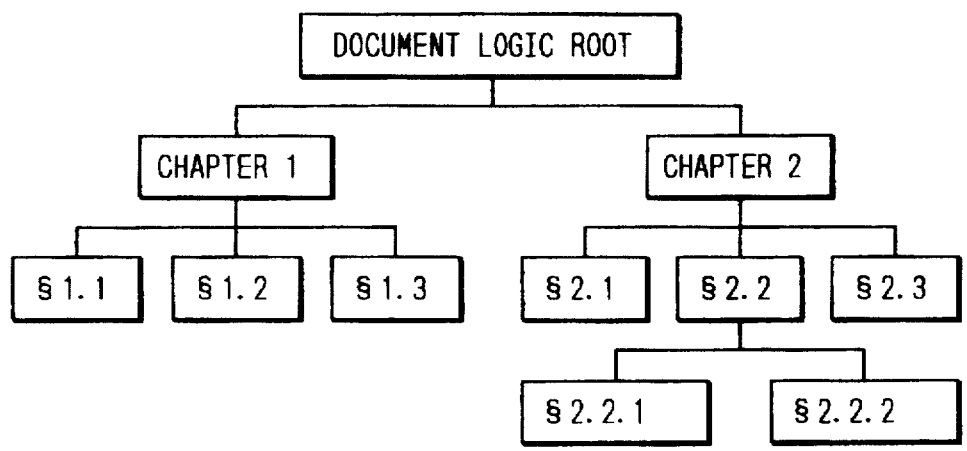
FIG. 4 is a diagram showing an example of a logic structure of a structured document.

Next, a case where a document, expressed by a tree structure as shown in FIG. 4, is treated as a process object will be described.

In this instance, addresses are assigned to the nodes in a tree structure. An operation on a set of addresses is defined. A method of applying a command to perform the operation will be described. A method of making an access on the basis of the operation on the address set will also be described.

Figure 5:
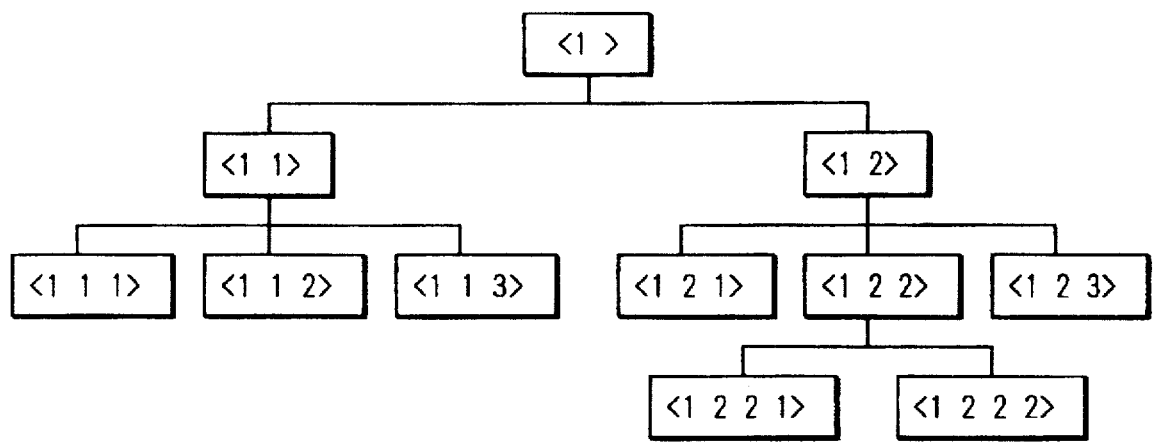
FIG. 5 is a diagram showing a tree structure for FIG. 4 when addresses are assigned to the nodes thereof according to the Dewey decimal sorting system.

As shown in FIG. 5, addresses are assigned to the nodes in the tree structure of FIG. 4 according to Dewey decimal sorting. The address is expressed by an array of figures.

From the addresses thus acquired, a connection relationship can be obtained immediately. With an assumption that the length of an address "addr" is length (addr), and the head "len" digit of the address "addr" is "hd" (addr, len), the necessary and sufficient condition of the fact that the object corresponding to the address a is an ancestor of the object corresponding to an address b, is a=hd (b, length (a)).

If a=<12> and b=<1212>, for example, then hd (b, length (a))=hd (<1212>, 2)=<12>=a.

A function "lub" having two addresses as arguments is defined as follows:

$$\text{lub}(a,b) = \text{hd}(a, \max\{i | \text{hd}(a,i) = \text{hd}(b,i)\})$$

where lub (a, b) is the youngest address of the ancestors to the objects corresponding to addresses a and b.

Figure 6:
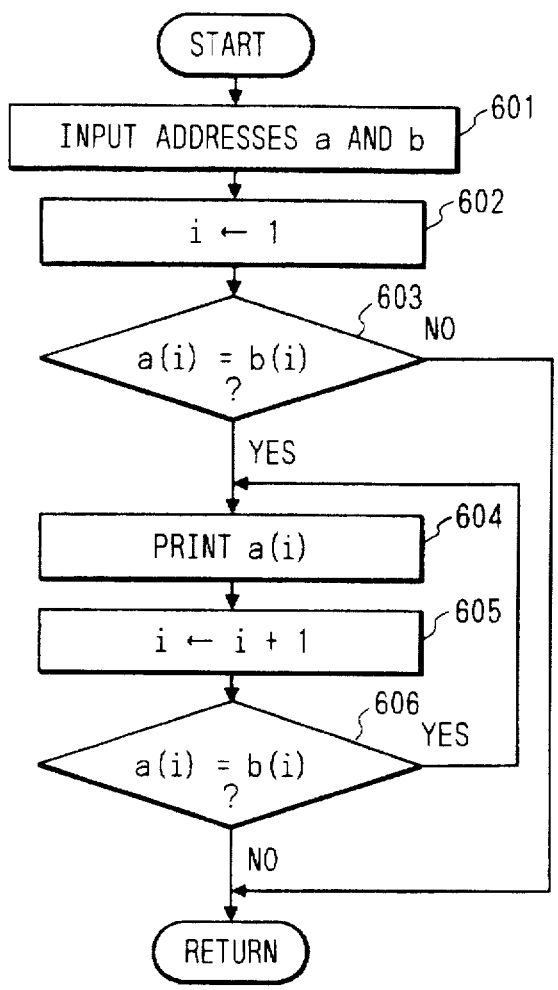
FIG. 6 is a flow chart showing a sequence of procedural steps to obtain a youngest ancestor of common ancestors.

This function can be programmed by a sequence of procedural steps as shown in FIG. 6.

The second identified acquisition section receives the addresses a and b (step 601), and sets i to a value "1" (step 602). Then, it checks whether a(i)=b(i) holds (step 603). If the answer is YES, it prints (i.e., outputs) a(i) (step 604), and set i to i+1 (step 605). Thereafter, it checks whether a(i)=b(i) holds (step 606). If the answer is YES, it returns to step 604, and executes step 604 and the subsequent ones. If the answer is NO, a return is made. Similarly, if the answer is NO in step 603, a return is made.

Subsequently, predicates "anc" and "desc" are defined using the function lub.

$$\text{anc}(a,b) <=> \text{lub}(a,b)=a$$

$$\text{desc}(a,b) <=> \text{lub}(a,b)=b$$

That is, anc (a, b) is true when a is the ancestor to or equal to b and only at that time, and desc (a, b) is true when a is the descendant to or equal to b and only at that time.

The set operations "above" and "below" are defined using the predicates anc and desc.

$$\text{above}(A,B) = \{a \in A | \exists(b \in B)(\text{anc}(a,b))\}$$

$$\text{below}(A,B) = \{a \in A | \exists(b \in B)(\text{desc}(a,b))\}$$

where A and B are sets.

The operation to obtain above (A, B) is equivalent to the operation to select the element of those of the set A, which is the ancestor to or equal to any of the elements of the set B.

The operation to obtain below (A, B) is equivalent to the operation to select the element of those of the set A, which is the descendant to or equal to any of the elements of the set B.

The set operations "top" and "bottom" are defined using the predicates anc and desc.

$$\text{top}(A) = \{a \in A | \forall(b \in A)(a \neq b \vee \neg \text{anc}(b,a))\}$$

$$\text{bottom}(B) = \{a \in A | \forall(b \in A)(a = b \vee \neg \text{desc}(b,a))\}$$

The operation to obtain top (A) is equivalent to the operation to select only the element of those of the set A, which is not the descendant to any of the remaining elements of the set A.

The operation to obtain bottom (A) is equivalent to the operation to select only the element of those of the set A, which is not the ancestor to any of the remaining elements of the set A.

Similarly, the predicates "mother" and "daughter" are defined, and the set operations "parent" and "child" can be defined using the predicates.

$$\text{mother}(a,b) <=> \text{above}(a,b) \wedge \text{length}(a) = \text{length}(b)-1$$

$$\text{daughter}(a,b) <=> \text{below}(a,b) \wedge \text{length}(a)+1 = \text{length}(b)$$

$$\text{parent}(A,B) = \{a \in A | (b \in B)(\text{mother}(a,b))\}$$

$$\text{child}(A,B) = \{a \in A | (b \in B)(\text{daughter}(a,b))\}$$

where A and B are sets.

The operation to obtain parent (A, B) is equivalent to the operation to select the element of those of the set A, which is the parent of or equal to any of the elements of the set B.

The operation to obtain child (A, B) is equivalent to the operation to select the element of those of the set A, which is the child of or equal to any of the elements of the set B.

Figure 7:
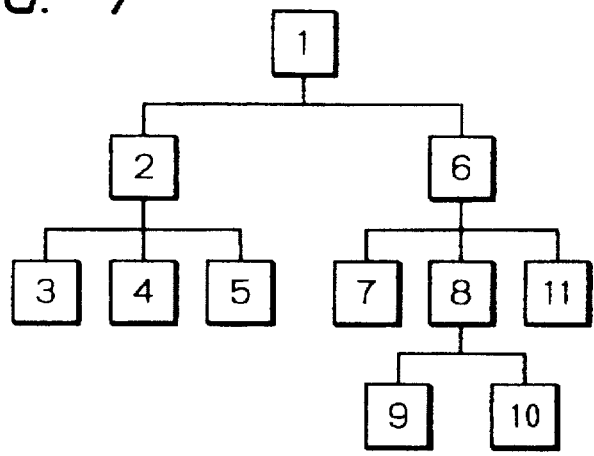
FIG. 7 is a diagram showing a preorder of the tree structure shown in FIG. 4.

A preorder of the tree structure shown in FIG. 4 is shown in FIG. 7, where the numbers indicate the preorder. In the logic structure of the structured document, in most cases, objects are laid out in the preorder. Accordingly, the preorder takes on a special significance. In the logic structure of FIG. 4, for example, Chapter 1, section 1.1, section 1.2, section 1.3, Chapter 2, section 2.1, section 2.2, section 2.2.1, section 2.2.2, and section 2.2.3, are laid out in this order.

When the addresses at the nodes in the tree structure of FIG. 4 are laid out in the preorder, the following exist:

<1>, <11>, <111>, <112>, <113>, <12>, <121>, <122>, <1221>, <1222>, <123>.

It is possible to determine which of two addresses precedes the other in the preorder by using the information of the addresses. It is assumed that the i-th element of the address addr is expressed as "addri", and when i>len (addr), addri=0.

The predicate "pred" is defined as follows:

$$pred(a,b) = alength(lub(a,b))+1 < blength(lub(a,b))+1$$

The pred (a, b) is a function for obtaining, from addresses a and b, the address which precedes the other in the preorder.

Similarly, the predicate "succ" is defined as follows:

$$succ(a,b) = alength(lub(a,b))+1 > blength(lub(a,b))+1$$

The succ (a, b) is a function for obtaining, from addresses a and b, the address which succeeds the other in the preorder.

The set operations "head" and "tail" are defined using the predicates "pred" and "succ" as follows:

$$head(A,B) = \{a A | (b B)(pred(a,b))\}$$

$$tail(A,B) = \{a a | (b B)(succ(a,b))\}$$

where A and B are sets.

The operation to obtain head (A, B) is equivalent to the operation to select one of the elements of the set A, which is equal to any of the elements of the set B or appears preceding to the latter in the preorder.

The operation to obtain tail (A, B) is equivalent to the operation to select one of the elements of the set A, which is equal to any of the elements of the set B or succeeds the latter in the preorder.

As described above, the operations based on the connection relationships (descendant relationship and the order relationship in the preorder) can be defined. The identifier operators for performing processes according to the defined operations can be realized.

Assuming that T indicates the whole set of identifiers of the constituents belonging to a given tree structure, and assuming A ⊃ T, then T\below (T, A) is equivalent to the operation to remove a partial tree of which the vertices are the respective elements of the set A from the original tree structure. A constituent accessor is structured to perform such an operation.

A process operation of the first embodiment will be described with reference to FIGS. 8 through 11.

Figure 8:
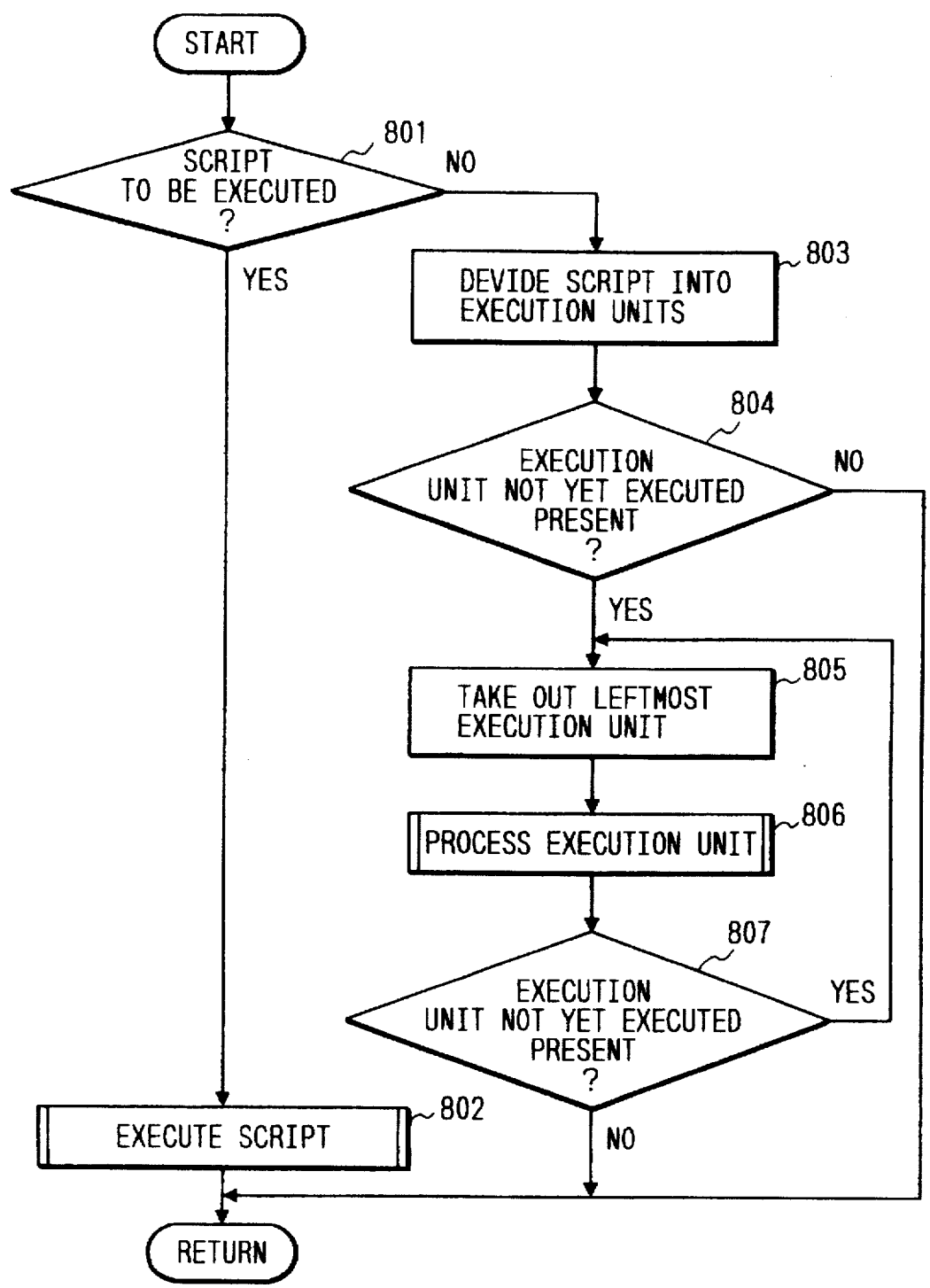
FIG. 8 is a flow chart showing a main routine of an overall process flow of the first embodiment.
Figure 9:
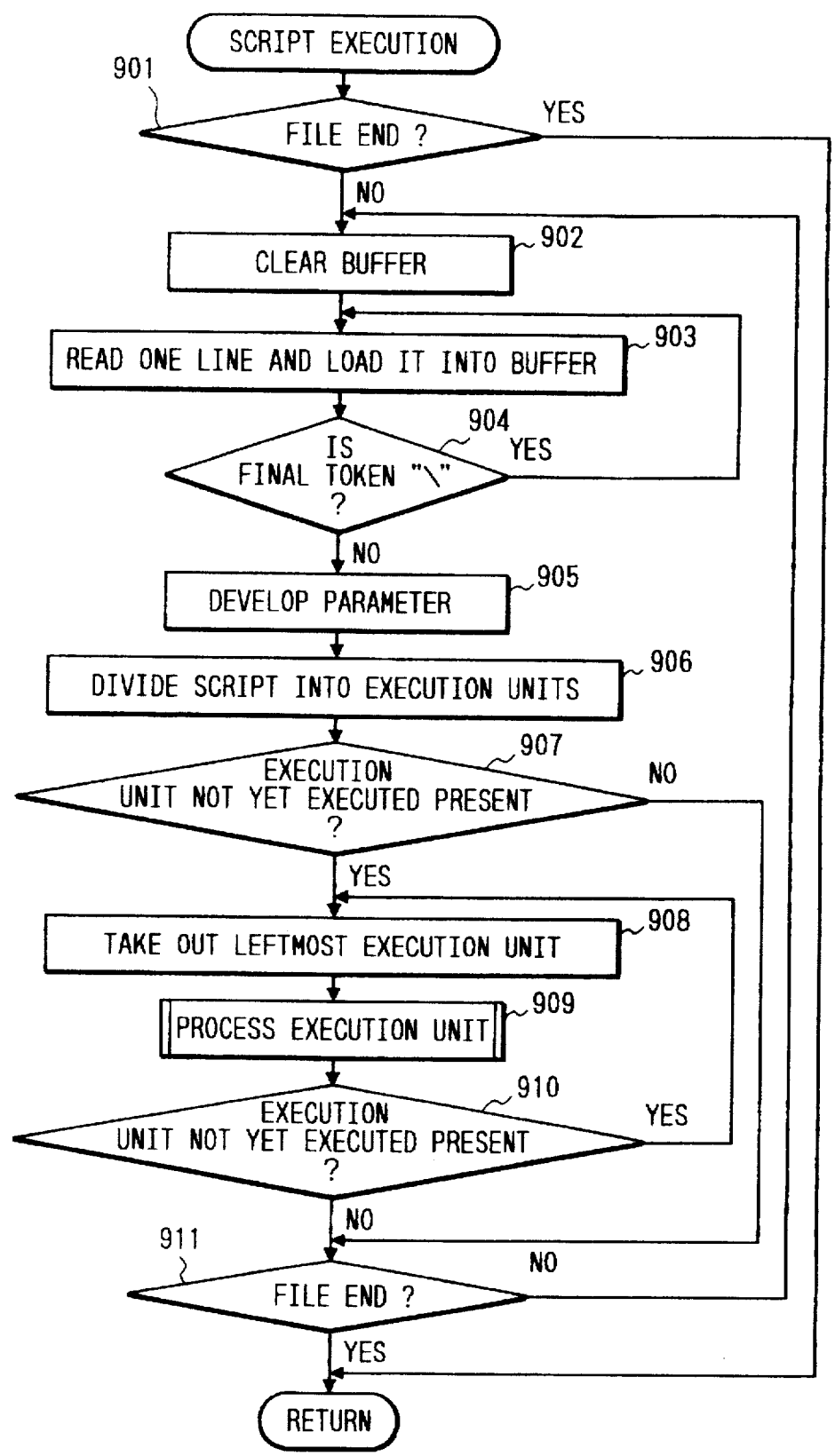
FIG. 9 is a flow chart showing a subroutine of a process for executing a script executed in the overall process flow.
Figure 10:
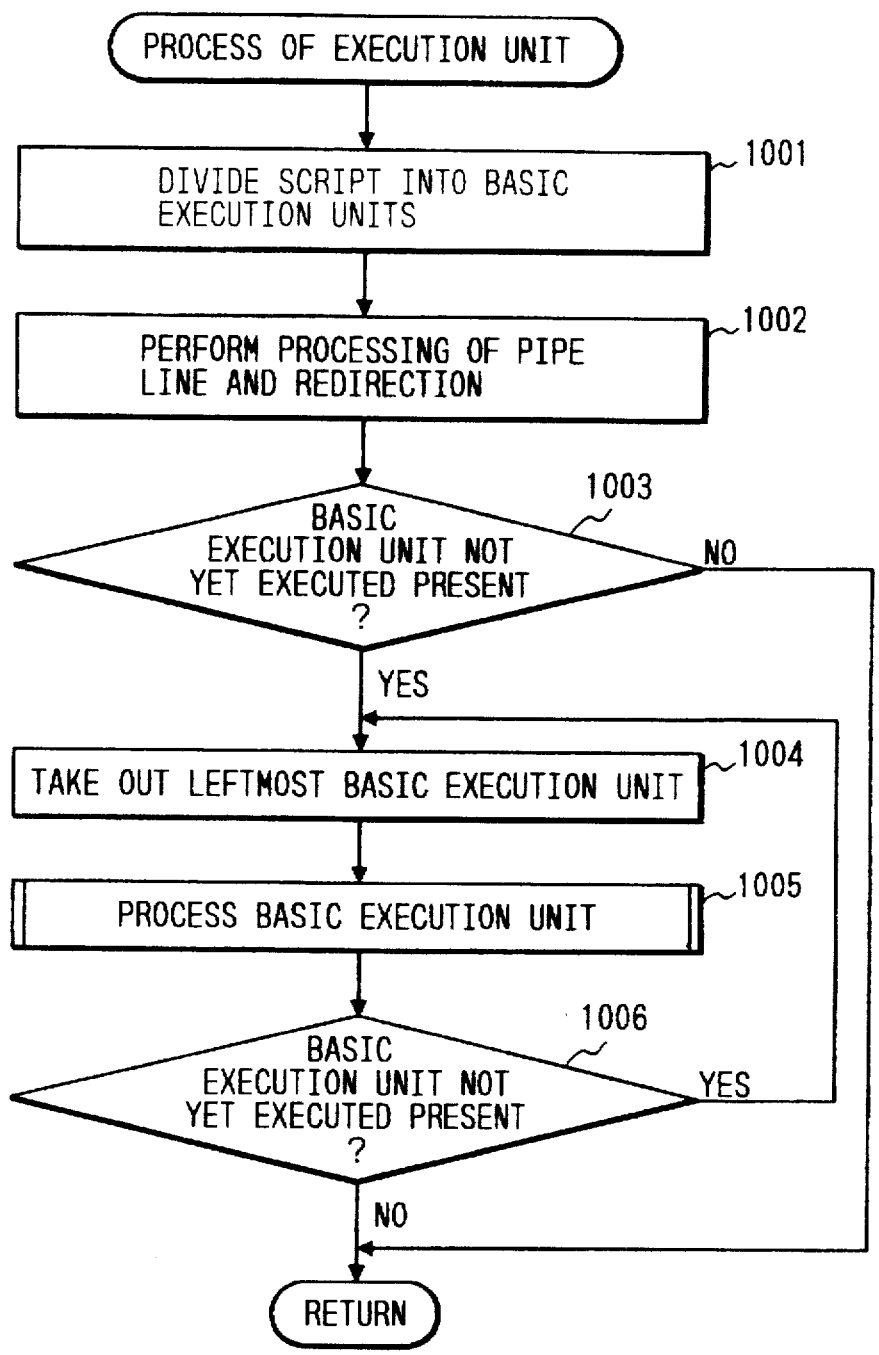
FIG. 10 is a flow chart showing a subroutine of a process for executing an execution unit in the script executing process.
Figure 11:
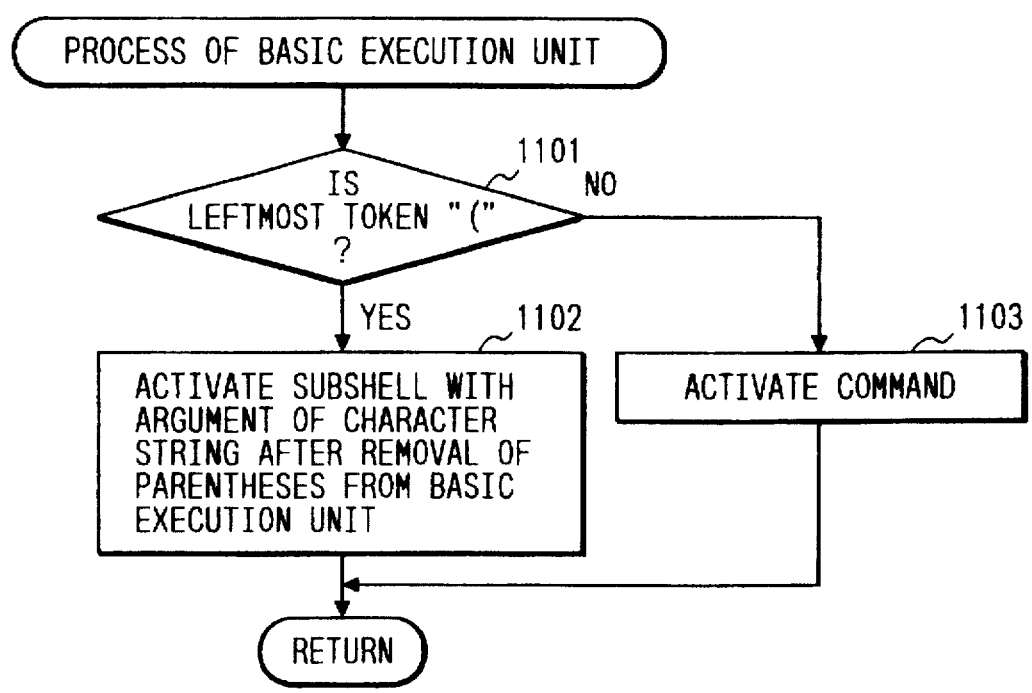
FIG. 11 is a flow chart showing a subroutine of a process for executing a basic execution unit in the execution unit executing process.

FIG. 8 is a flow chart showing a main routine of an overall process flow of the first embodiment. FIG. 9 is a flow chart showing a subroutine of a process to execute a script executed in the overall process flow. FIG. 10 is a flow chart showing a subroutine of a process to execute an execution unit executed in the script executing process. FIG. 11 is a flow chart showing a subroutine of a process to execute a basic execution unit executed in the execution unit executing process.

The definitions of the execution unit and the basic execution unit will be described.

It is assumed that a, b, c, . . . , z are commands.

Each command is a basic execution unit. Each command and its argument also constitute a basic execution unit. Either or both of the input and the output of a command (and its argument) constitute a basic execution unit.

A basic execution unit is an execution unit.

In an expression where commands are connected by a semicolon ";", for example, a ; b, each of the commands is one basic execution unit. In this case, two basic execution units a and b are provided.

In an expression where commands are connected by a pipe, for example, a | b, the whole expression constitutes one execution unit.

An expression where an execution unit is put in paired parentheses, for example, (a, b), is one basic execution unit.

In a more complicated example, (a ; b) | c, the whole expression constitutes one execution unit.

The overall process flow of the first embodiment will now be described. As shown in FIG. 8, a shell (command interpreter) determines whether a script is to be executed (step 801). If the script is to be executed, i.e., if the answer is YES, it executes the script (step 802).

In step 801, if the script is not to be executed, i.e., if the answer is NO, it divides the script into execution units (step 803), and determines whether an execution unit not yet executed is present (step 804). If the answer is YES, that is if an execution unit not yet executed is present, the leftmost execution unit (step 805) is taken out, and the execution unit is (step 806) is executed. Thereafter, the shell determines whether an execution unit not yet executed is present (step 807). If the answer is YES, the shell returns to step 805 and executes step 805 and the subsequent sequence of steps.

In steps 804 and 807, if an execution unit not yet executed is absent, the shell returns.

Next, the execution of the script will be described.

As shown in FIG. 9, the shell determines whether the file ends (step 901). If the answer is NO, the buffer (step 902) is cleared, and one line of the script is read and loaded into the buffer (step 903). A determination is also made whether the final token of the read line is "\" (step 904).

In step 904, if "\" is determined, the shell returns to step 903 and executes step 903 and the subsequent sequence of steps. If "\" is not determined the shell develops the parameter (step 905) and divides the script into execution units (step 906). Further, the shell determines whether the execution unit is present (step 907).

In step 907, if an execution unit not yet executed is present, the shell takes out the leftmost execution unit (step 908) and executes the execution unit (step 909), and determines whether an execution unit not yet executed is present (step 910).

In step 910, if an execution unit not yet executed is present, the shell returns to step 908 and executes step 908 and the subsequent sequence of steps. If an execution unit not yet executed is absent, a determination is made as to whether the file ends (step 911).

In step 907, if an execution unit not yet executed is absent, the shell advances to step 911.

In step 911, if the file does not yet end, the shell returns to step 902 and executes step 902 and the subsequent sequence of steps. In steps 911 and 901, if the file ends, the shell ends its processing operation, and returns to step 802 in FIG. 8.

Next, the preferred process of the execution unit will be described.

As shown in FIG. 10, the shell divides the execution unit into basic execution units (step 1001), and performs the procedures of pipe and redirection (step 1002).

The shell determines whether a basic execution unit not yet executed is present (step 1003). If a basic execution unit is not yet executed, the leftmost basic execution unit (step 1004) is taken out, the leftmost basic execution unit (step 1005) is executed, and a determination is made as to whether a basic execution unit not yet executed is present (step 1006).

In step 1006, if a basic execution unit not yet executed is present, the shell returns to step 1004 and executes step 1004 and the subsequent sequence of steps. In steps 1006 and 1003, if a basic execution unit not yet executed is absent, the shell ends its operation and returns. When the execution unit is processed according to the subroutine of executing the script, the shell returns to step 802 in FIG. 8. When the execution unit is processed according to the subroutine of executing the command, the shell returns to step 909 in FIG. 9.

Next, the preferred process of the basic execution unit will be described.

As shown in FIG. 11, the shell determines whether the leftmost token is "(" (step 1101). If it is "(", the shell activates the subshell, with the argument of a character string after removal of the parentheses from the basic execution unit (step 1102). If it is not "(", the shell activates the command (step 1103). In step 1102, if the subshell is activated, the subshell executes the sequential procedures shown in FIGS. 8 to 11 (that is, the procedures shown in FIGS. 8 to 11 are recursively executed).

After completing step 1102 or 1103, a return is made to step 1005 in FIG. 10.

The already existing shell can be used for the script execution.

Figure 12:
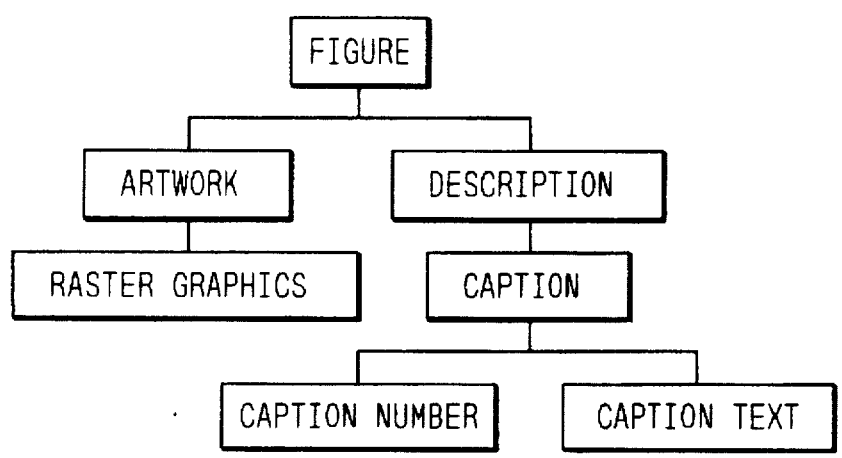
FIG. 12 is a diagram showing an example of the logic structure of a figure in the structured document.
Figure 13:
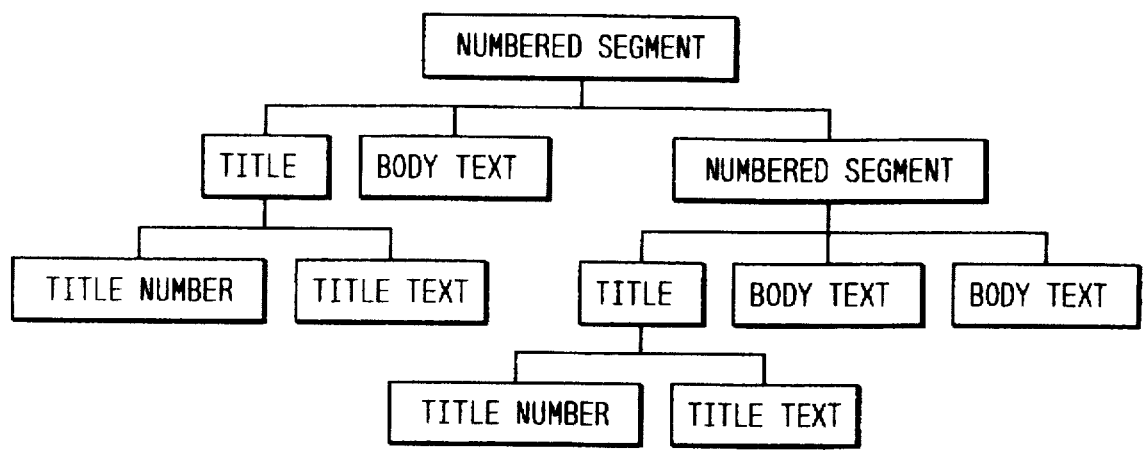
FIG. 13 is a diagram showing an example of the logic structure of a chapter/section in the structured document.

At this point, the processing of documents as processing objects, as shown in FIGS. 12 and 13, will be described.

FIG. 12 shows a logic structure of a figure, and FIG. 13 is a logic structure of a chapter. In these figures, character strings within rectangular blocks are assigned, as values of the attribute "uobject-type", to the constituents.

In the logic structure shown in FIG. 12, the figure consists of graphics and optional captions. A constituent noted as "Figure" is the root of the logic structure describing graphics. A constituent "Raster Graphics" is the content portion including the graphics. A constituent "Caption Number" is the content portion having the caption number. A constituent "Caption Text" is the content portion having the caption text.

In the logic structure shown in FIG. 13, the chapter consists of title, repeat of paragraph end, and optional partial paragraphs. Accordingly, the chapter (or section) may be nested. A constituent denoted "Numbered Segment" is the root of the logic structure describing the chapter (section). A constituent "title" is the root of a partial tree describing the title. A constituent "Title Number" is the content portion having the chapter (section) title number. A constituent "Title Text" is the content portion having the text of the chapter (section) title.

Examples of the specifications of the commands for actually performing command procedures and examples of script using the commands will be presented hereinafter. Such script preferably is script of the Bourne shell (for the specification of the Bourne shell, reference is made to the on-line manual of UNIX).

The commands segmented by semicolons are sequentially executed. A string of commands enclosed by parentheses, executed by the subshell, are handled like a single command. A backslash at the end of a line indicates that the line is continued to the next line.

$1 and $2 are parameters (positional parameters) which refer to the argument assigned to the script (exactly, the document name or the file name). If "% foo who are you", where "foo" is the script name, is input from the command line, $1 is "who", $2, is "are", and $3 is "you".

!/bin/sh (select-type -e Figure $1; select-type -e Title $1)

|union\extract -s - $1

This script is used for retrieving the figure and title of a specified document. The argument is the name of a document as a retrieval object. When a plurality of arguments are given, the second argument and the subsequent ones are ignored.

A first select-type command is executed to obtain an identified series of a constituent (i.e., the root of a partial tree, which represents the figure) in which the value of the attribute "uobject-type" includes "Figure", in the constituent description of a specified file.

A second select-type command is then executed to obtain an identifier series of a constituent (i.e., the root of a partial tree, which represents the title) in which the value of the attribute "uobject-type" includes "Title", in the constituent description of a specified file. A union command is further executed to obtain the union of sets of the two identifier series (sets), which are obtained by executing the first and second select-type commands. Finally, an extract command is executed to take out of the file, i.e., a constituent description series of a partial tree of which the vertex is the constituent contained in the identifier series obtained by executing the union command.

As described above, in the first embodiment, the document parts satisfying the conditions can be retrieved from a specified structured document.

Next, a second embodiment of the present invention will be described with reference to FIG. 14.

Figure 14:
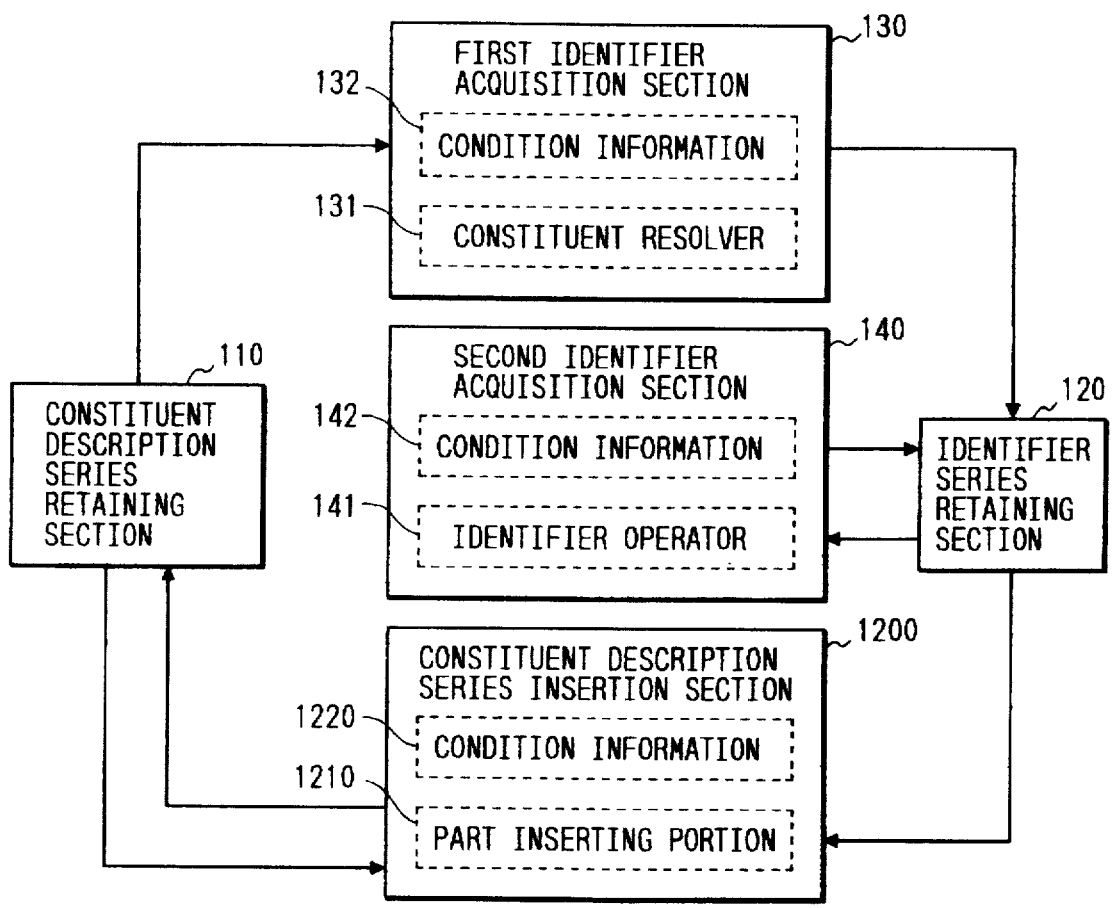
FIG. 14 is a functional block diagram of a document processing apparatus according to a second embodiment of the present invention.

FIG. 14 is a functional block diagram of a document processing apparatus according to the second embodiment of the present invention. The functional block diagram of the second embodiment corresponds to that of the first embodiment shown in FIG. 1, except that a constituent description series insertion section 1200 is used instead of the constituent description series acquisition section 150. FIG. 14, like reference numerals are used for designating like portions in FIG. 1.

In the constituent description series insertion section 1200, a part inserting portion 1210 inserts a constituent description series, which corresponds to an identifier series obtained by the second identifier acquisition section 140, into a group of constituent description series, which is retained in the constituent description series retaining section 110. The insertion is made according to condition information 1220 of a designated condition.

The condition information 1220 indicates the condition of the document part insertion. The constituent description series, after insertion by the part inserting portion 1210, is retained in the constituent description series retaining section 110 in a state that it can be distinguished from other constituent description series already retained therein. The constituent description series may be a process object.

Also in the second embodiment, the constituent description series insertion section 1200 employs control means which executes software (program) for performing the function of the constituent. Accordingly, the part inserting portion 1210 corresponds to the part insertion command (i.e., insert command).

In the second embodiment, the identifier operator 141 of the second identifier acquisition section 140 is set so as to correspond to the bottom command. The shell processing for executing the script is similar to those described in connection with the FIGS. 8 to 11.

Examples of the specifications of the commands for actually performing procedures and an example of script (command procedure) using the commands are presented hereinafter.

```
!/bin/sh
select-type -e Segment $2|bottom>pid
insert -yc pid $1 $2
```

This script is designed for inserting a constituent description series in a file, which is to be inserted as a part (referred to as a part file), into the position of the last of the head paragraph of the paragraphs of the lowest level that are contained in a constituent description series in another file (referred to as a document file).

The first argument of the script is a part file to be inserted as a part, and the second argument is a document file to be inserted as a part. When more than three argument are used, arguments subsequent to the third one are ignored.

The select-type command is executed to obtain an identifier series of a constituent (the root of a partial tree representing the paragraph) including "Segment" as the value of the attribute "uobject-type", where the constituent is one of the constituents of the document file. In this case, the bottom command is executed to obtain only the identifier series of the constituent of the lowest level in the identifier series that is obtained by executing the select-type command. The output produced as a result of executing the bottom command is stored into the work file pid. Finally, the insert command is executed to insert the constituent description series of the part file into the document file. The insertion position of the constituent description series is the last position of the constituent that corresponds to the head identifier in the file pid.

In the second embodiment of the invention, a document part is extracted from a structured document, and is inserted into another structured document.

Next, a third embodiment of the present invention will be described with reference to FIG. 15.

Figure 15:
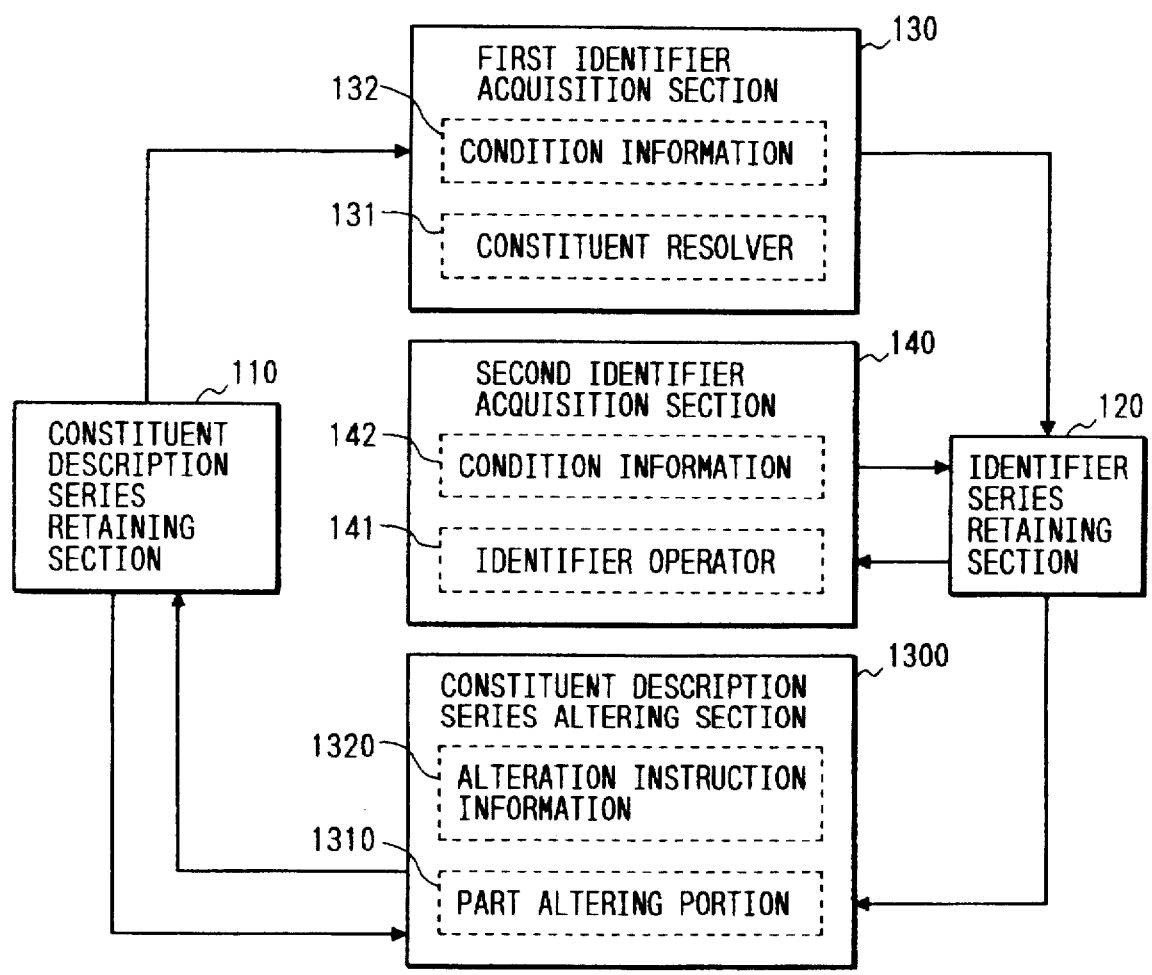
FIG. 15 is a functional block diagram of a document processing apparatus according to a third embodiment of the present invention.

FIG. 15 is a functional block diagram of a document processing apparatus according to the third embodiment of the present invention. The functional block diagram of the third embodiment corresponds to that of the first embodiment shown in FIG. 1 except that a constituent description series altering section 1300 is used instead of the constituent description series acquisition section 150. In FIG. 15, like reference numerals are used for designating like portions in FIG. 1.

In the constituent description series altering section 1300, a part altering portion 1310 alters a constituent description series, which corresponds to an identifier series acquired by the second identifier acquisition section 140, according to specified alteration instruction information 1320 indicative of the attribute of a document part. The constituent description series altered by the part altering portion is stored in the constituent description series retaining section 110 in a state that it can be distinguished from other constituent description series already retained therein. The constituent description series may be a process object.

Also in the third embodiment, the constituent description series altering section 1300 employs a control means which executes software (program) for performing the function of the constituent. The part altering portion 1310 corresponds to the part alteration command (i.e., chval command).

In the third embodiment, the constituent resolver 131 of the first identifier acquisition section 130 corresponds to the select-type command. The identifier operator 141 of the second identifier acquisition section 140 corresponds to the union command. The shell processing for executing the script is similar to those described in connection with FIGS. 8 to 11.

Examples of the specifications of the commands for actually performing procedures and an example of script (command procedure) using the commands are presented hereinafter.

```
!/bin/sh
(select-type -e Figure $1; (select-type -e Segment
$1)|union|chval -n Patent Tokkyo -$1>$1.$$
mv $1. $$ $1
```

This script is for altering into Tokkyo, a character string "Patent" that appears in the attribute "user visible name" of the root of a partial tree representing a figure or paragraph in a specified document.

A parameter $$ is developed into a process number of /bin/sh when the script is executed.

The two select-type commands are used like the select-type command Script Example 1 of the first embodiment. The union command is executed to obtain the union of sets of the identifier series that are obtained by executing the two select-type commands. The chval command is executed to replace the character string "Patent" contained in the attribute "user visible name" of a constituent description series specified by the identifier series that is obtained by executing the union command, with "Tokkyo". The constituent description series resulting from execution of the chval command is stored into the work file. Finally, the UNIX standard command mv is executed to replace the name of the work file with the name of the original document.

As described above, the third embodiment of the present invention is able to alter the attribute of a document part in a specified structured document according to an attribute specification.

Next, the fourth embodiment of the present invention will be described with reference to FIG. 16.

Figure 16:
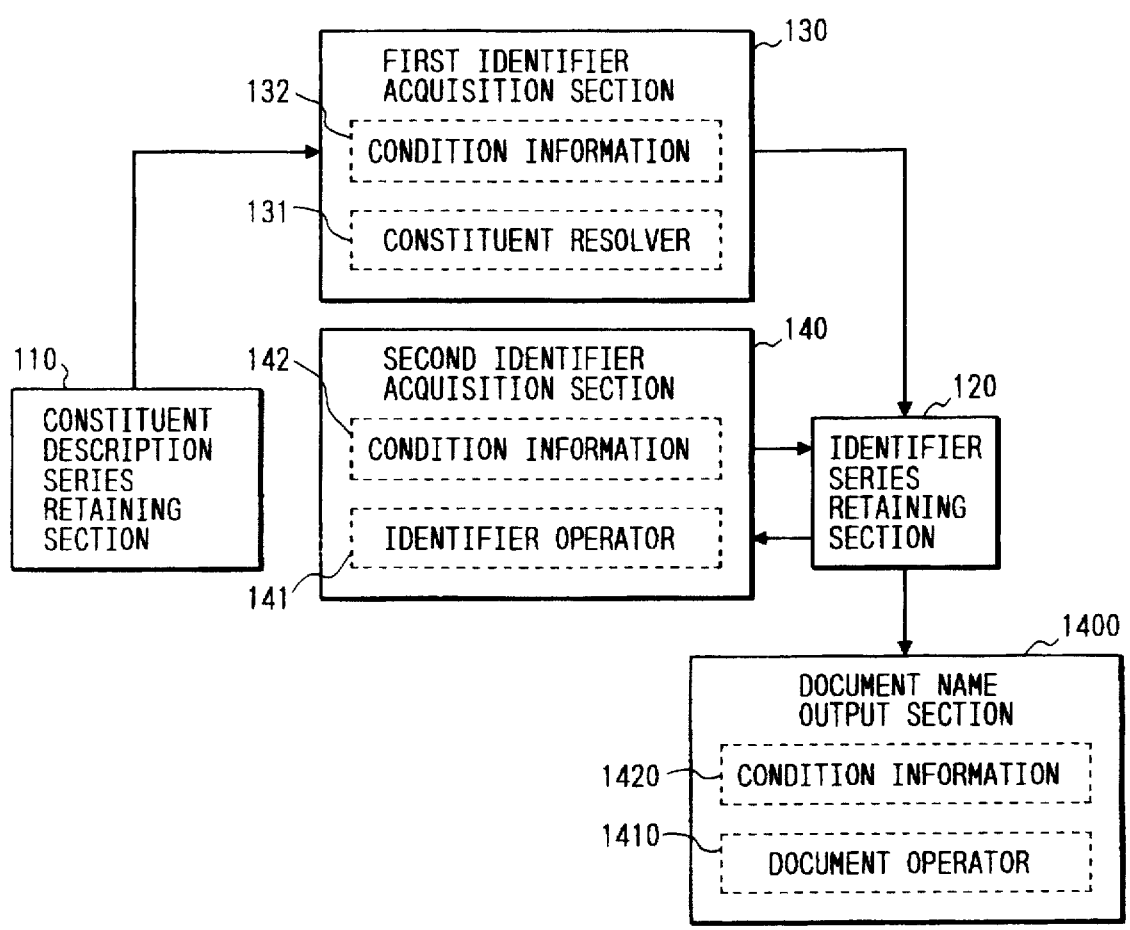
FIG. 16 is a functional block diagram of a document processing apparatus according to a fourth embodiment of the present invention.

FIG. 16 is a functional block diagram of a document processing apparatus according to the fourth embodiment of the present invention. The functional block diagram of the fourth embodiment corresponds to that of the first embodiment shown in FIG. 1 except that a document name output section 1400 is used instead of the constituent description series acquisition section 150. In FIG. 16, like reference numerals are used for designating like portions in FIG. 1.

The document name output section 1400 checks the number of identifiers in an identifier series acquired by the second identifier acquisition section 140. When the result of the number check satisfies condition information 1420, which is specified as a third condition, the document name output section outputs the name of a predescribed document. The condition information 1420 is indicative of a condition for acquiring the document name.

Also, in the fourth embodiment, the document name output section 1400 employs control means which executes software (program) for performing the function of the constituent. The document operator 1410 corresponds to the command (i.e., id-doc) of the document operator.

In the fourth embodiment, the constituent resolver 131 of the first identifier acquisition section 130 corresponds to the select-type command. The identifier operator 141 of the second identifier acquisition section 140 corresponds to the union command. The shell processing for executing the script is similar to procedures described in connection with FIGS. 8 to 11.

Examples of specifications of the commands for actually performing command procedures and an example of script using the commands are presented hereinafter.

```
!/bin/sh (select-type -e Figure $1; (select-type -e Segment
$1)|union|\id-doc -gt 10 $1
```

This script operates to check the number of figures and paragraphs in a given document, and when the total number of figures and paragraphs is 10 or more, it outputs the name of the given document. When this condition is not satisfied, nothing is output.

The select-type command and the union command are used like the select-type command the union command in Script Example 3 of the third embodiment. The id-doc command is executed to check the number of identifiers obtained by the execution of the union command. When the number is 10 or more, the name of the given document is output to the standard output.

The fourth embodiment is able to obtain only the document name of a structured document satisfying the designated condition.

Next, a fifth embodiment of the present invention will be described with reference to FIG. 17.

Figure 17:
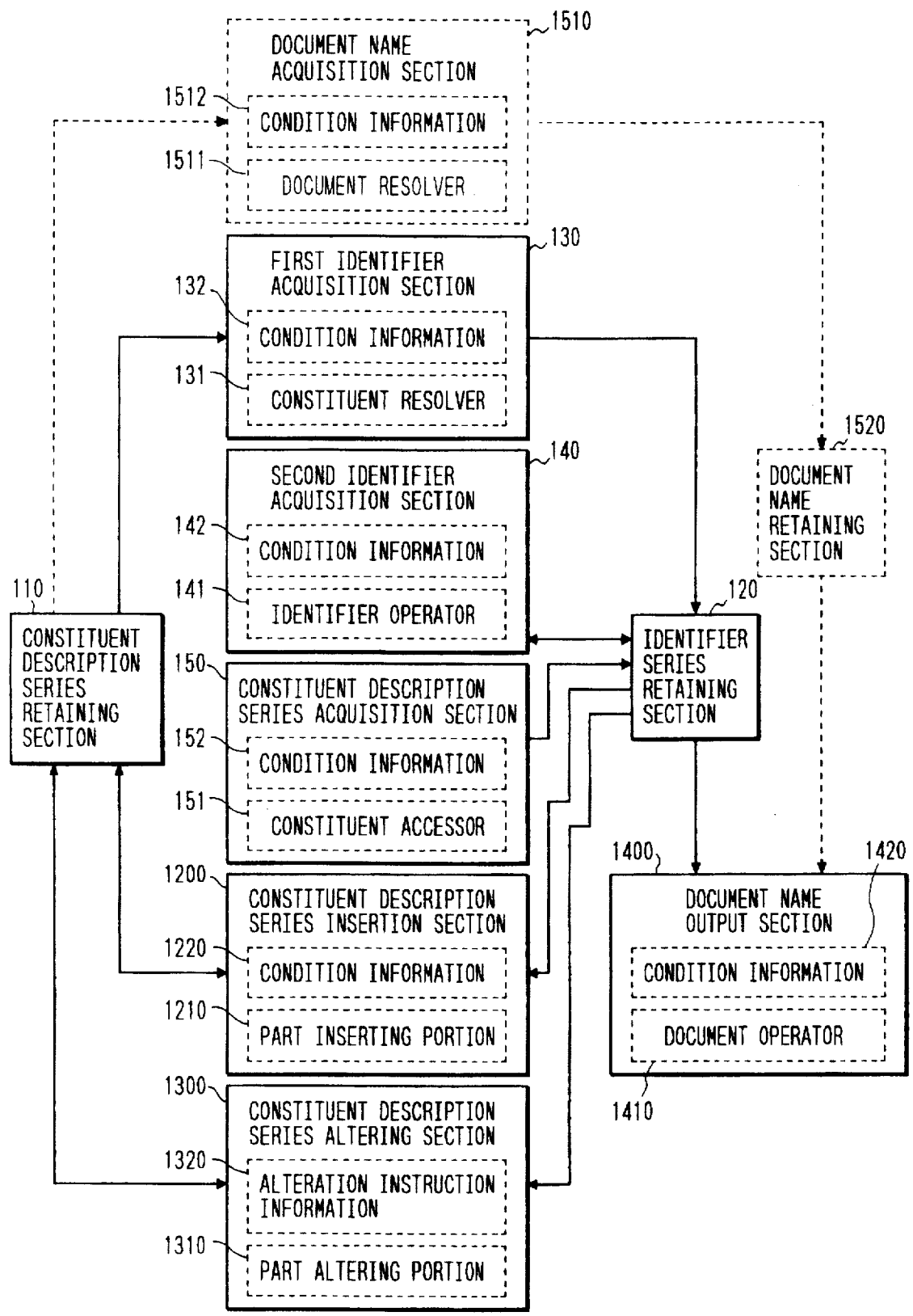
FIG. 17 is a functional block diagram of a document processing apparatus according to a fifth embodiment of the present invention.
Figure 18:
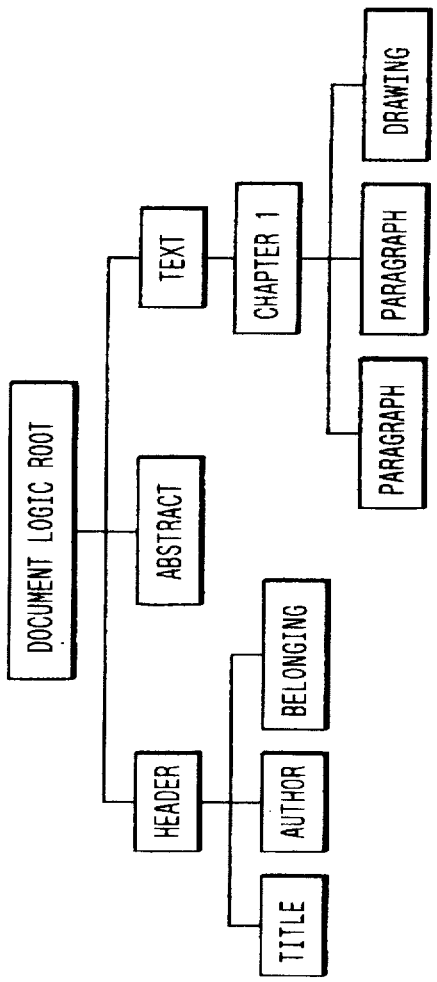
FIG. 18 is a diagram showing a logic structure of a structured document which illustrates the document processing.
Figure 19:
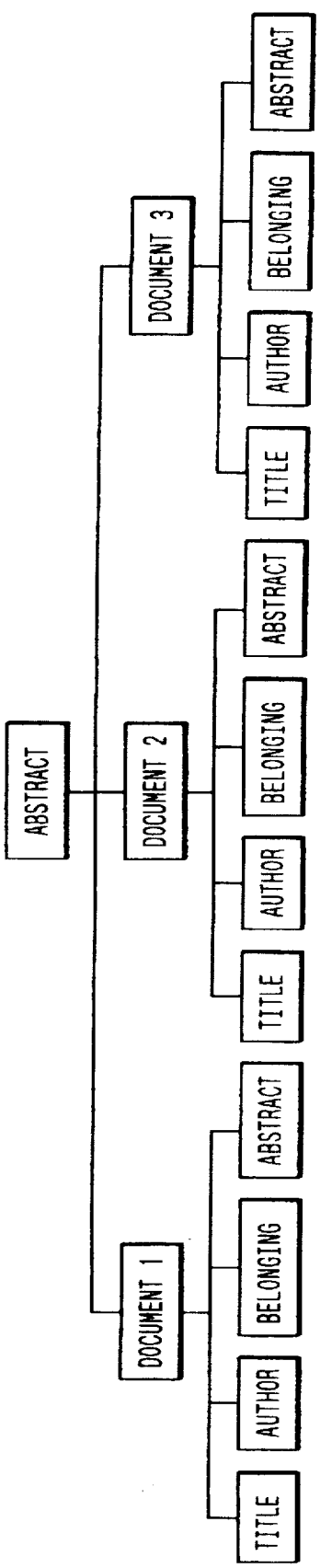
FIG. 19 is a diagram showing a document output when the structured document shown in FIG. 18 is processed.
Figure 20:
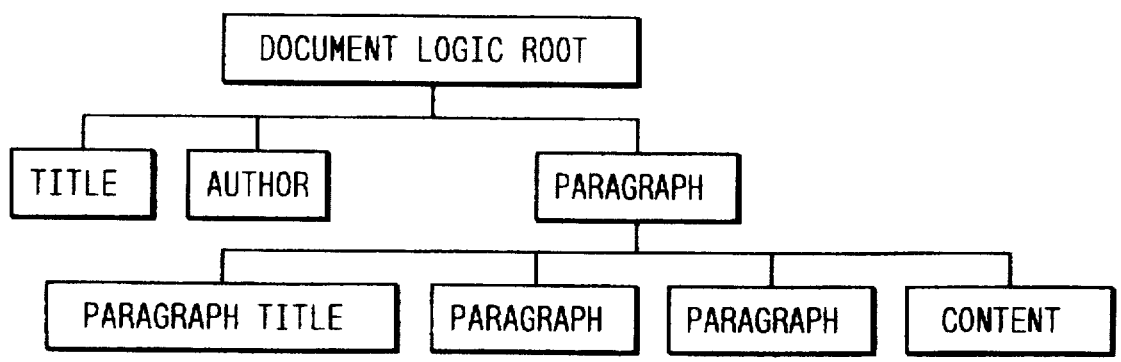
FIG. 20 is a diagram showing a logic structure of another structured document which illustrates the document processing.
Figure 21:
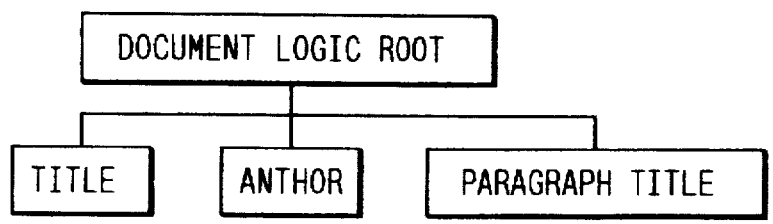
FIG. 21 is a diagram showing a document output when the structured document shown in FIG. 20 is processed.

FIG. 17 is a functional block diagram of a document processing apparatus according to the fifth embodiment of the present invention. The functional block diagram of the fifth embodiment is a combination of the functional block diagrams of the first to fourth embodiments. As shown, the arrangement of the fifth embodiment corresponds to the arrangement of the first embodiment shown in FIG. 1 coupled additionally with the constituent description series insertion section 1200 in the functional block diagram of the second embodiment shown in FIG. 14, the constituent description series altering section 1300 in the functional block diagram of the third embodiment shown in FIG. 15, and the document name output section 1400 in the functional block diagram of the fourth embodiment shown in FIG. 16.

In the fifth embodiment, the shell processing for executing the script is similar to those procedures described in connection with FIGS. 8 to 11.

Examples of the specifications of the commands for actually performing command procedures and examples of scripts using the commands are presented hereinafter.

```
!/bin/sh select-type -e Segment $2|bottom>pid select-type -e Figure $1|extract -s -$1|\ insert -yc pid - $2
```

This script operates in a manner that with input of two documents, it inserts a figure that is contained in a document specified by a first argument, into a position of the last of the first paragraph of the lowest level paragraphs of a document specified by a second argument.

The execution state of the first line is as described in Script Example 3 of the third embodiment. The second select-type command is used like the first select-type command in Script Example 3 in the third embodiment.

The extract command is executed to extract a constituent description series representing the figure of the document specified by the first argument. Finally, the inserted command is executed to insert the constituent description series that is obtained by executing the extract command, into the document specified by the second argument. The insertion is made in exactly the same manner as that in Script Example 2 in the second embodiment.

```
!/bin/sh select-type -e Segment $2|bottom>pid select-type -e Figure $1|chval -n Patent Tokkyo -$1|\insert -yc pid
 - $2
```

This script, operating like that of Script Example 2, updates the attribute value of the constituent of the root of a partial tree representing a figure.

The execution state of the first line is as described in Script Example 3 of the third embodiment. The second select-type command is used like the first select-type command in Script Example 2 in the second embodiment. The chval command is used like the chval command in Script Example 3 in the third embodiment. Finally, the insert command is executed, to perform an insertion process similar to that performed when the insert command is executed in Script Example 5.

```
!/bin/sh (select-type -e Figure $1; select-type -e Segment $1)

|union|\extract -s $1>part echo -n>empty chval -n Patent Tokkyo empty part
```

This script operates to search a constituent description series representing a figure or a paragraph, and to alter the value of the attribute "user visible name" of the constituent.

The select-type command, the union command, and the extract command are executed to search a partial tree representing the figure or the paragraph from a document specified by the argument, and to store a corresponding constituent description series into the work file part. The UNIX standard command echo is executed without using the argument, thereby generating a empty file "empty". Finally, the chval command is executed to replace, with "Tokkyo", a character string "Patent" appearing in the value of the attribute "user visible name", with all of the constituent description series stored in the file part being treated as an operation object.

```
!/bin/sh select-type -e Segment $2|bottom>pid select-type -e Figure $1>fig extract -s fig $1|chval -n Patent Tokkyo fig $1|\insert -yc pid -$2
```

This script functions like that in Script Example 7. In Script Example 8, the insertion position is determined as in Script Example 6, but it differs from that in Script Example 7.

```
!/bin/sh select-type -e Figure $1>extract -s s$1|\sed -e 'user visible-name/
    s/Patent/Tokkyo/g'
```

In this example, a character string "Patent", contained in the attribute user visible name" in the constituent description series obtained by the retrieval, is replaced with "Tokkyo" by using the UNIX standard command sed, which performs the text operation.

Next, a case where a document, with the logic structure shown in FIG. 12 is processed, will be described.

Script presented below retrieves only figures from a document and generates a document based on only the figures.

```
% select-type -e Figure test.doc|extract -s test.doc|\ insert -yc -p "3"- skeleton.doc>result.doc
```

The select-type command is first executed to enumerate identifiers of a constituent in which a partial tree series "Figure" is included in the value of the attribute "uobject-type", and to write to the standard output. Then, the extract command is executed to read the identifier series from the standard output and to extract a constituent description series corresponding to a partial tree having the root of each identifier from the file test doc.

Finally, the insert command is executed to read the extracted partial tree from the standard output and to load the partial tree into skeleton.doc. The constituent description series, thus obtained, is written to the standard output. The skeleton.doc consists of only the header portion of the document and a specific logic root. The resultant constituent description series is redirected to the result.doc file, providing an output document.

Another script retrieves figures, each including a character string "viewpoint" as a caption, and generates a document consisting of such figures. This script is a modification of Script Example 9.

```
% (select-type Figure test.doc; select-content\ viewpoint test, doc) | above | extract -s - test.doc|\ insert -yc -p "3" - skeleton.doc>result.doc
```

The file skeleton resembles that in Script Example 10. In this script, the "select-content" command is used for enumerating identifiers of the content portion including a character string "viewpoint". The "above" command is executed to read two identifier series and to output an identifier series of the constituent where the predicate "above" holds. Each identifier series is generated by a constituent resolver (select-type, select-content), so that it is the identifier series of a constituent where the predicate holds. Accordingly, the result (output) of executing the "above" command is an identifier series of a figure including a character string "viewpoint" as a caption.

Another script, presented below, functions to select paragraphs of the lowest level contained in a chapter (or paragraph) including a character string "introduction" as a caption, and arranges them into a single document.

```
!/bin/sh (select-type -e Segment test.doc;\

(select-content -p introduction test.doc;\ select-type -e title test.doc) \ below) \ above \ bottom | extract -s -test.doc\ insert -yc -p "3"- skeleton.doc>result.doc
```

The "below" command reads two constituent description series, and outputs an identifier series of the constituent where the predicate "below" holds. Accordingly, this script enumerates the content portions including a character string "introduction" of those belonging to the constituent in which the value of the attribute "unobject-type" contains a character string "title".

The "bottom" command reads one identifier series, and outputs a constituent description series where the predicate "bottom" holds.

In the above-mentioned embodiments, the following two methods are used to obtain the document name. 1) The document name is described in the script. 2) The script includes the document name as the argument to be executed.

Alternatively, the document name may be obtained from the constituent described series. To realize this alternative, a document name acquisition section 1510 and a document name retaining section 1520 are additionally used as indicated by dotted lines in FIG. 17.

In the document name acquisition section 1510, a document resolver 1511 acquires the document name or names from the constituent description series retaining section 110 according to designated condition information 1512 indicating the condition for acquiring a document name series. The acquired document name is stored into the document name retaining section 1520.

The document name output section 1400 checks the number of identifiers that are stored in the identifier series retaining section 120 and acquired by the second identifier acquisition section 140. When the check result satisfies a specified third condition, the document name output section outputs the document name stored in the document name retaining section 1520.

As described above, the fifth embodiment of the present invention is able to retrieve the document part satisfying a designed condition from a specified structured document, and inserts the document part into another structure document.

The fifth embodiment is able to retrieve the document part satisfying the designated condition from a specified structured document, and to alter the attribute of the document part to a specified attribute.

Further, the fifth embodiment is able to retrieve the document part satisfying the designated condition from a specified structured document, to alter the attribute of the document part to a specified attribute, and to insert the document part into another structured document.

In the embodiments disclosed above, a document processing function (device), if it can handle any of the constituent description series, the identifier series, and the document name series, can execute the described document procedures.

In accordance with the foregoing description, the present invention acquires an identifier series corresponding to a constituent satisfying a specified first condition from a constituent description series including a plurality of constituents each having an identifier attached thereto and corresponding to a predescribed document or documents or a document part or parts, acquires the identifier series satisfying a specified second condition from the identifier series, and performs preset procedures on the constituent description series and the predescribed document or documents or a document part or parts on the basis of the identifier series satisfying the second condition. In performing the preset processes or procedures, the invention performs any or a plurality of the processes of acquiring or the constituent description series, inserting or the constituent description series, altering the attribute value of the constituent description series, and outputting of the document name. Accordingly, the invention can retrieve the document part satisfying the condition from the specified document.

The present invention can extract a document part from a document, and insert it into another document. The invention can also obtain the document name of the document satisfying a designated condition.

The invention retrieves a document part satisfying the designated condition from a specified document, and inserts the document part into another document. The invention further retrieves the document part satisfying the designated condition from the specified document, and alters the attribute of the document part of the retrieved document to a specified attribute value.

The invention also retrieves the document part satisfying the designated condition from the specified document, alters the attribute of the document part to be designated attributed value, and inserts the document part into the specified structured document.

Since the document processing is based on the constituent description series and the identifier series, a document processing method is provided which can exactly perform the processes of retrieve, insertion, composition, and update of documents or document parts. A document processing apparatus is provided for executing the document processing method.

Further, since specific processing of a structured document is performed by rearranging the identifier series, fine processing can be performed in a unit distinguishable by constituent identifiers.

In structured document processing by the invention, since only documents at the upper level in all documents are operated, the processing can be performed easily.

In structured document processing by the invention, since a constituent is constructed only by operating the identifiers, the operation language is not limited and processing can be realized in a conventional processing apparatus or between different processing apparatuses.

What is claimed is:

1. A document processing method for processing documents each having a document logic structure in which constituents of a document are linked with relationships therebetween, each of the constituents of the document being assigned an identifier on the basis of positions of the constituents in the corresponding document logic structure, the constituents in each document logic structure being described in respective constituent descriptions, each document logic structure being described by a series of the constituent descriptions, comprising the steps of:

receiving a first condition designated by a user and relating to content of the constituents and a second condition designated by the user and relating to positional relationships among the constituents;

selecting constituents of the documents which satisfy the first condition and acquiring respective first identifiers of the selected constituents;

acquiring, from the first identifiers, respective second identifiers which satisfy the designated second condition; and obtaining respective constituent descriptions of constituents identified by the second identifiers.

2. The document processing method according to claim 1, further including at least one of the following steps:

inserting the constituent descriptions of the constituents identified by the second identifiers into a series of constituent descriptions of constituents of at least one document if another designated condition exists;

altering the constituent descriptions of the constituents identified by the second identifiers if the another designated condition exists; and checking the second identifiers satisfying the second condition, and outputting a name or names of a document or documents or a document part or parts having at least one constituent identified by one of the second identifiers which satisfies a designated third condition.

3. A document processing apparatus for retrieving parts of documents each having a document logic structure in which constituents of a document are linked with relationships therebetween, each of the constituents of the document being assigned an identifier on the basis of positions of the constituents in the corresponding document logic structure, the constituents in each document logic structure being described in respective constituent descriptions, each document logic structure being described by a series of the constituent descriptions, comprising:

means for receiving a first condition designated by a user and relating to content of the constituents and a second condition designated by the user and relating to positional relationships among the constituents;

first identifier acquisition means for selecting constituents of the documents which constituents satisfy the first condition and acquiring respective first identifiers of the selected constituents;

first identifier retaining means for retaining the first identifiers acquired by said first identifier acquisition means;

second identifier acquisition means for acquiring, from the first identifiers retained in said first identifier retaining means, respective second identifiers satisfying the second condition; and constituent description acquisition means for acquiring respective constituent descriptions of constituents identified by the second identifiers.

4. A document processing apparatus for inserting into a predetermined document parts of documents each having a document logic structure in which constituents of a document are linked with relationships therebetween, each of the constituents of the document being assigned an identifier on the basis of positions of the constituents in the corresponding document logic structure, the constituents in each document logic structure being described in respective constituent descriptions, each document logic structure being described by a series of the constituent descriptions, the apparatus comprising:

means for receiving a first condition designated by a user and relating to content of the constituents and a second condition designated by the user and relating to positional relationships among the constituents;

first identifier acquisition means for selecting constituents of the documents which satisfy the first condition and acquiring respective first identifiers of the selected constituents;

first identifier retaining means for retaining the first identifiers acquired by said first identifier acquisition means;

second identifier acquisition means for acquiring, from the first identifiers retained in said first identifier retaining means, respective second identifiers satisfying the second condition; and constituent description insertion means for inserting constituent descriptions of constituents identified by the second identifiers into respective descriptions of constituents of a predetermined document if a designated condition exists.

5. A document processing apparatus for updating descriptions of parts of documents each having a document logic structure in which constituents of a document are linked with relationships therebetween, each of the constituents of the document being assigned an identifier on the basis of positions of the constituents in the corresponding document logic structure, the constituents in each document logic structure being described in respective constituent descriptions, each document logic structure being described by a series of the respective constituent descriptions, the apparatus comprising:

means for receiving a first condition designated by a user and relating to content of the constituents and a second condition designated by the user and relating to positional relationships among the constituents;

first identifier acquisition means for selecting constituents of the documents which constituents satisfy the first condition and acquiring respective first identifiers of the selected constituents;

first identifier retaining means for retaining the first identifiers acquired by said first identifier acquisition means;

second identifier acquisition means for acquiring, from the first identifiers retained in said first identifier retaining means, respective second identifiers satisfying the second condition; and constituent description altering means for altering according to designated alteration instruction information, respective constituent descriptions of constituents identified by the second identifiers acquired by said second identifier acquisition means.

6. A document processing apparatus for retrieving a document having a document logic structure in which constituents of the document are linked with relationships therebetween, each of the constituents of the document being assigned an identifier on the basis of positions of the constituents in the corresponding document logic structure, the constituents in each document logic structure being described in respective constituent descriptions, each document logic structure being described by a series of the constituent descriptions, the apparatus comprising:

means for receiving a first condition designated by a user and relating to content of the constituents and a second condition designated by the user and relating to positional relationships among the constituents;

first identifier acquisition means for selecting constituents of the documents which constituents satisfy the first condition and acquiring respective first identifiers of the selected constituents;

first identifier retaining means for retaining the first identifiers acquired by said first identifier acquisition means;

second identifier acquisition means for acquiring, from the first identifiers retained in said first identifier retaining means, respective second identifiers satisfying the second condition; and document name output means for checking the second identifiers satisfying the second condition, and outputting a name or names of a document or documents or a document part or document parts having at least one constituent identified by a second identifier which satisfies a designated third condition.

7. The document processing apparatus according to claim 3, further comprising constituent description series insertion means for inserting respective constituent descriptions of constituents identified by the second identifiers into constituent descriptions of a predetermined document upon a designated condition.

8. The document processing apparatus according to claim 3, further comprising constituent description altering means for altering, according to designated alteration instruction information, respective constituent descriptions of constituents identified by the second identifiers acquired by said second identifier acquisition means.

9. A document processing apparatus for processing documents each having a document logic structure in which constituents of a document are linked with relationships therebetween, each of the constituents of the document being assigned an identifier on the basis of positions of the constituents in the corresponding document logic structure, the constituents in each document logic structure being described in respective constituent descriptions, each document logic structure being described by a series of the constituent descriptions, the apparatus comprising:

means for receiving a first condition designated by a user and relating to content of the constituents and a second condition designated by the user and relating to positional relationships among the constituents;

first identifier acquisition means for selecting constituents of the documents which constituents satisfy the first condition and acquiring respective first identifiers of the selected constituents;

first identifier retaining means for retaining the first identifiers acquired by said first identifier acquisition means;

second identifier acquisition means for acquiring, from the first identifiers retained in said first identifier retaining means, respective second identifiers satisfying the second condition;

constituent description altering means for altering according to designated alteration instruction information, respective constituent descriptions of constituents identified by the second identifiers; and constituent description insertion means for inserting respective constituent descriptions of constituents identified by the second identifiers into respective constituent descriptions of a predetermined document if another designated condition exists.

10. A document processing apparatus for processing documents each having a document logic structure in which constituents of a document are linked with relationships therebetween, each of the constituents of the document being assigned an identifier on the basis of positions of the constituents in the corresponding document logic structure, the constituents in the document logic structure being described in respective constituent descriptions, the document logic structure being described by a series of the constituent descriptions, the apparatus comprising:

means for receiving a first condition designated by a user and relating to content of the constituents and a second condition designated by the user and relating to positional relationships among the constituents;

first identifier acquisition means for selecting constituents of the documents which constituents satisfy the first condition and acquiring respective first identifiers of the selected constituents;

first identifier retaining means for retaining the first identifiers acquired by said first identifier acquisition means;

second identifier acquisition means for acquiring, from the first identifiers retained in said first identifier retaining means, respective second identifiers satisfying the second condition;

constituent description acquisition means for acquiring constituent descriptions of constituents identified by the second identifiers;

constituent description altering means for altering the respective constituent descriptions of constituents identified by the second identifiers according to designated alteration instruction information; and constituent description insertion means for inserting the constituent descriptions of constituents identified by the second identifiers into respective constituent descriptions of a predetermined document if another designated condition exists.

11. A document processing apparatus comprising:

input means for inputting a desired document processing operation;

constituent description retaining means for storing one or more constituents corresponding to a document or documents or a document part or document parts, the constituents being assigned with identifiers on the basis of positions of the constituents in each of respective logic structures of the documents;

first identifier retaining means for extracting and retaining one or more first identifiers corresponding to one or more constituents to be operated upon according to values of respective identifiers by the desired document processing operation from said input means;

second identifier retaining means for extracting one or more second identifiers corresponding to one or more constituents to be operated upon according to descriptions of respective constituents by the desired document processing operations from said input means; and constituent description means for constructing one or more constituents corresponding to the second identifiers of said second identifier retaining means and according to said constituent description retaining means.

12. A document processing method for processing documents each having a document logic structure in which constituents of a document are linked with relationships therebetween, each of the constituents of the document being assigned a Deway address in the logic structure, the constituents in the document logic structure being described in respective constituent descriptions, the document logic structure being described by a series of the constituent descriptions, comprising the steps of:

receiving a first condition designated by a user and relating to content of the constituents and a second condition designated by the user and relating to positional relationships among the constituents;

selecting constituents of the documents which satisfy the first condition and acquiring respective first Deway addresses of the selected constituents;

acquiring, from of the first identifiers, respective second Deway addresses which satisfy the designated second condition; and obtaining respective constituent descriptions of constituents identified by the second Deway addresses.

* * * * *